(12) United States Patent
Jones

(10) Patent No.: US 10,620,829 B2
(45) Date of Patent: Apr. 14, 2020

(54) SELF-CALIBRATING GESTURE-DRIVEN INPUT SYSTEM

(71) Applicant: Brigham Young University, Provo, UT (US)

(72) Inventor: Francis Russel Jones, Elk Ridge, UT (US)

(73) Assignee: WriteSoft LLC, Salem, UT (US)

(*) Notice: Subject to any disclaimer, the term of this patent is extended or adjusted under 35 U.S.C. 154(b) by 0 days.

(21) Appl. No.: 15/999,150

(22) Filed: Aug. 16, 2018

(65) Prior Publication Data

US 2019/0056863 A1   Feb. 21, 2019

Related U.S. Application Data

(60) Provisional application No. 62/546,434, filed on Aug. 16, 2017, provisional application No. 62/643,358, filed on Mar. 15, 2018, provisional application No. 62/607,856, filed on Dec. 19, 2017.

(51) Int. Cl.
*G06F 3/0488* (2013.01)
*G06F 3/041* (2006.01)
*G06F 3/0354* (2013.01)

(52) U.S. Cl.
CPC ...... *G06F 3/04886* (2013.01); *G06F 3/03543* (2013.01); *G06F 3/03547* (2013.01); *G06F 3/0418* (2013.01); *G06F 3/04883* (2013.01)

(58) Field of Classification Search
CPC ............... G06F 3/0418; G06F 3/04883; G06F 3/04886; G06F 3/03543; G06F 3/03547
See application file for complete search history.

(56) References Cited

U.S. PATENT DOCUMENTS

| | | | |
|---|---|---|---|
| 10,019,072 B2* | 7/2018 | Hwang | G06F 3/018 |
| 2013/0113714 A1* | 5/2013 | Mao | G06F 3/0234 345/173 |
| 2018/0321841 A1* | 11/2018 | Lapp | G06F 3/04886 |

* cited by examiner

*Primary Examiner* — Nelson M Rosario
(74) *Attorney, Agent, or Firm* — Ray Quinney & Nebeker

(57) ABSTRACT

The present disclosure relates to systems, methods, and computer readable media for implementing an efficient and flexible system for entry of input commands using finger-specific touch gestures. For example, in response to detecting calibration gestures, systems described herein can determine input zones for detecting zone-specific touch gestures that are mapped to corresponding zone-specific input commands. The systems disclosed herein can further adapt to the size, orientation, and shifting position of a user's hands by periodically recalibrating the input zones based on detected movement of detected touch gestures with respect to the input zones. Thus, the systems described herein implement a self-calibrating gesture-driven input system having increased flexibility and efficiency over conventional touch-based input systems.

20 Claims, 15 Drawing Sheets

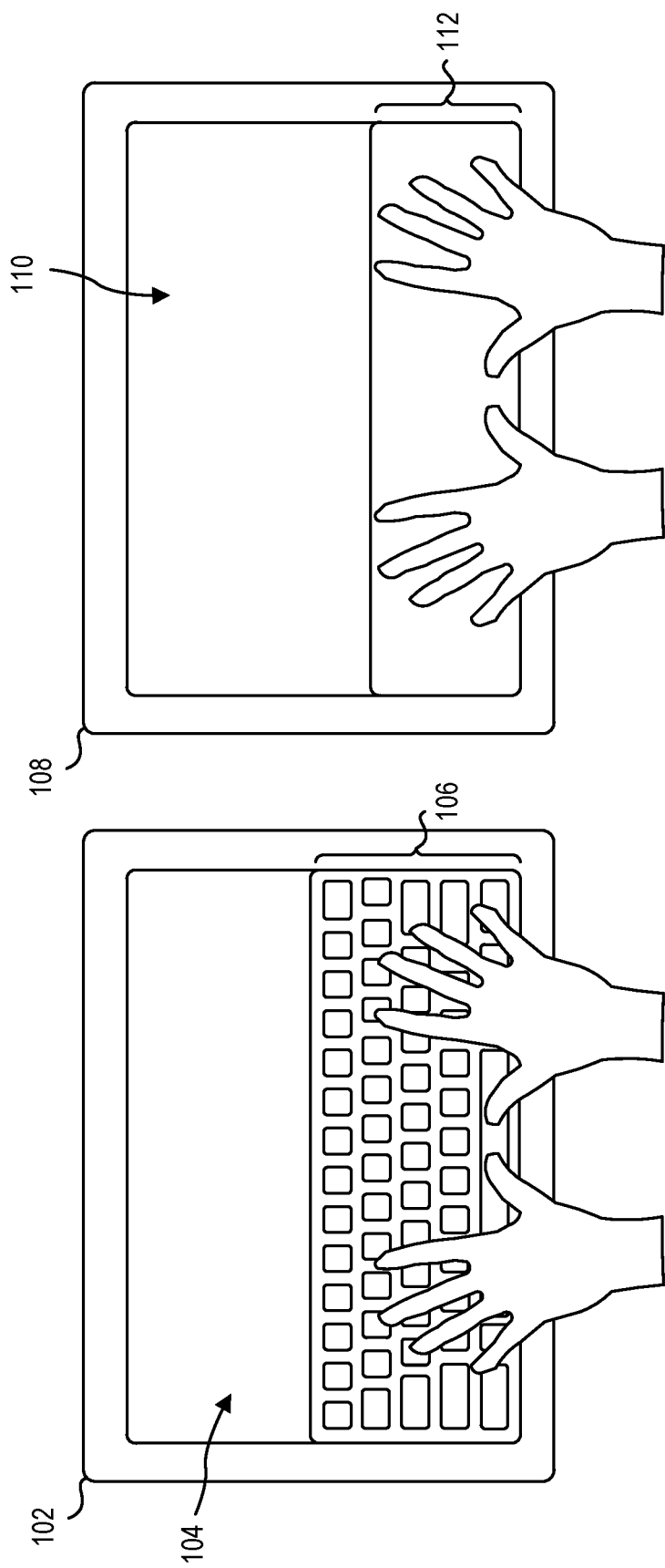

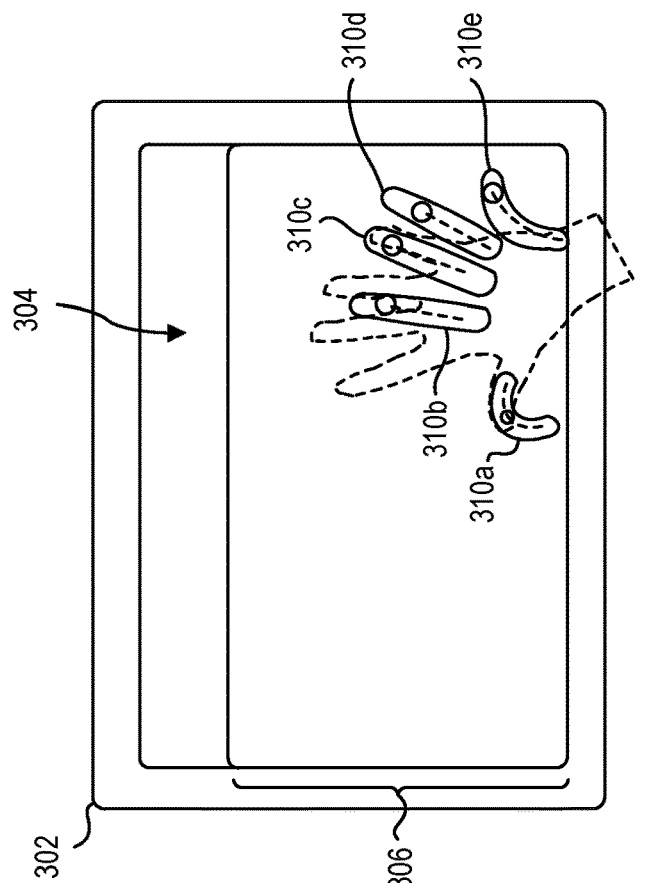
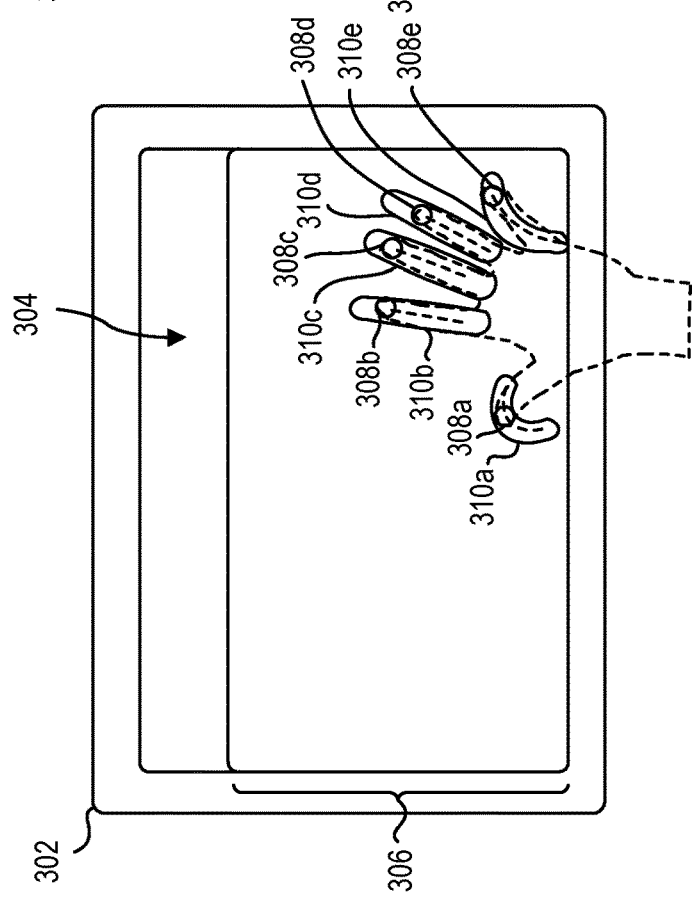
FIG. 3B
FIG. 3A

FIG. 5A

| | 4 | 3 | 2 | 1 | 0 | 0 | 1 | 2 | 3 | 4 |
|---|---|---|---|---|---|---|---|---|---|---|
| | LEFT | | | | | RIGHT | | | | |
| TAP | r | n | o | t | COMMA | PERIOD | e | a | i | s |
| DOWN | y | m | u | d | PERIOD | COMMA | h | l | c | f |
| UP | q | k | b | g | TAB | TAB | w | p | v | x |
| TAP | | 4,3 | 3,2 | 2,1 | | | 1,2 | 2,3 | 3,4 | |
| DOWN | | i | a | e | | | t | o | n | |
| UP | | c | l | h | | | d | u | m | |
| TAP | | v | p | w | | | g | b | k | |
| DOWN | | | 4,3,2 | 3,2,1 | | | 1,2,3 | 2,3,4 | | |
| UP | | | s | j | | | z | r | | |
| TAP | | | f | ENTER | | | DELETE | y | | |
| DOWN | | | x | DELETE | | | ENTER | q | | |
| UP | | | | 4,3,2,1 | | | 1,2,3,4 | | | |
| TAP | | | | z | | | j | | | |
| DOWN | | | | SPACE | | | SPACE | | | |
| UP | | | | SHIFT | | | SHIFT | | | |

502 → 504, 506

| Gesture | Sub-Zone | LEFT HAND | | | | | RIGHT HAND | | | | |
|---------|----------|---|---|---|---|---|---|---|---|---|---|
| | | 4 | 3 | 2 | 1 | 0 | 0 | 1 | 2 | 3 | 4 |
| TAP | Upper | r | n | o | t | COMMA | PERIOD | e | a | i | s |
| TAP | Lower | y | m | u | d | PERIOD | COMMA | h | l | p | f |
| DOWN | Upper | q | k | b | g | TAB | TAB | w | p | c | x |
| DOWN | Lower | i | a | e | z | DELETE | ENTER | j | t | v | n |
| UP | Upper | w | c | l | h | ENTER | DELETE | d | u | m | g |
| UP | Lower | s | j | v | p | | | b | k | z | r |
| DOWN | Upper | x | SPACE | | | | | | | | y |
| UP | Lower | | SHIFT | | | | | | | | q |

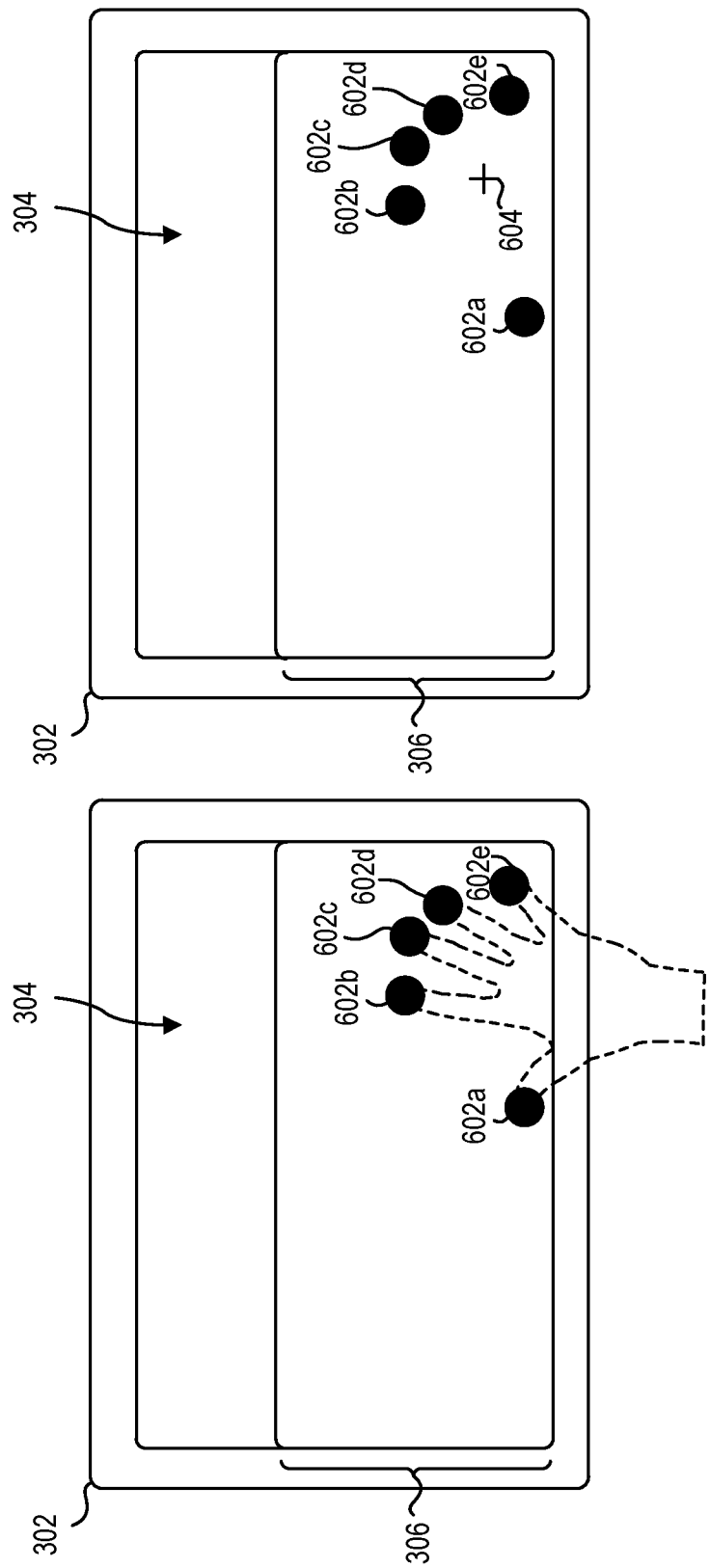

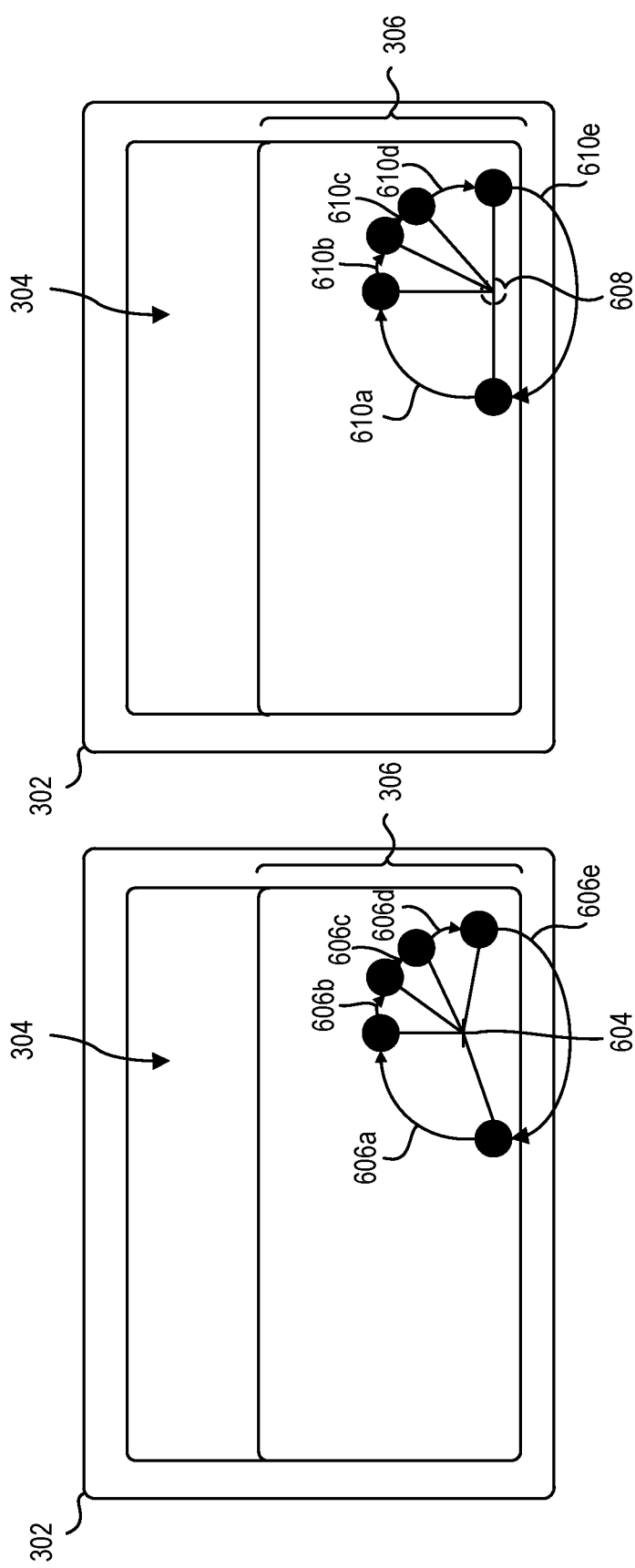

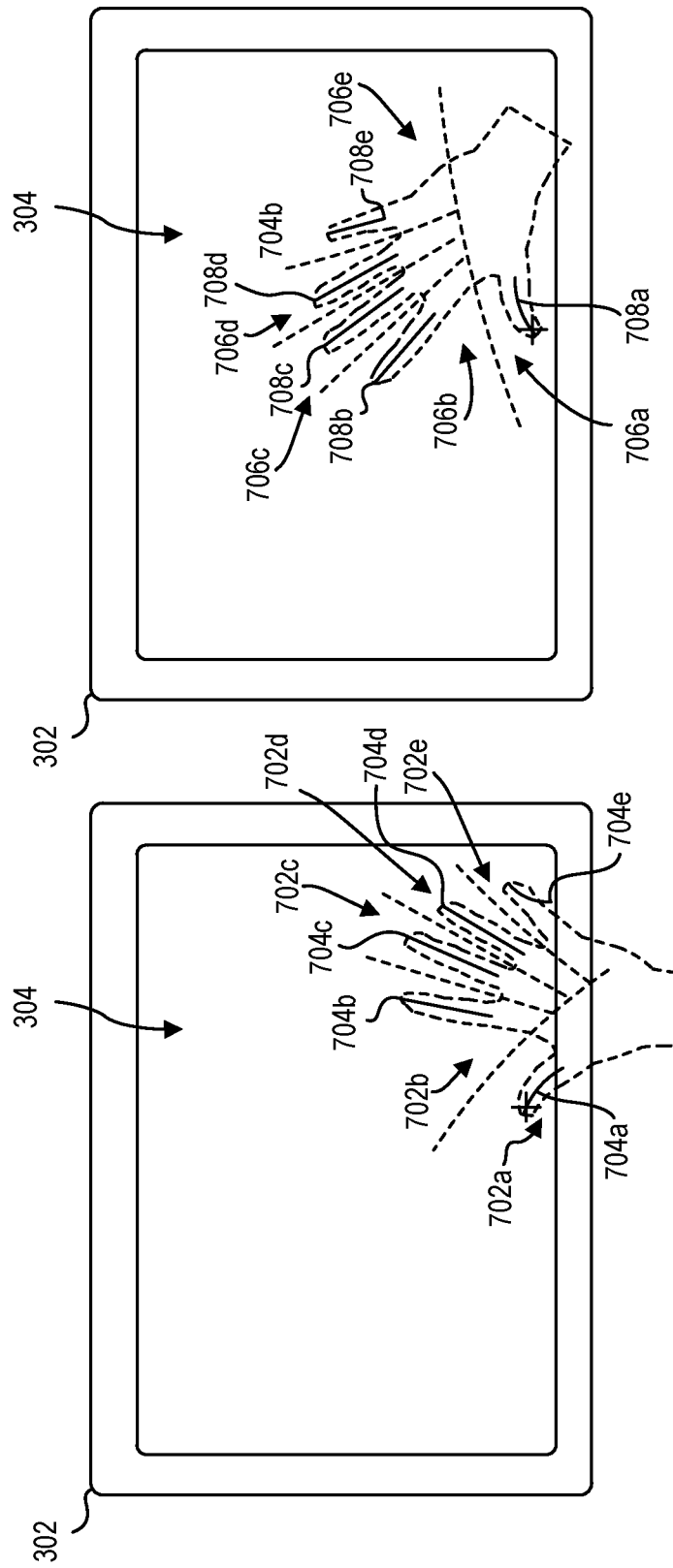

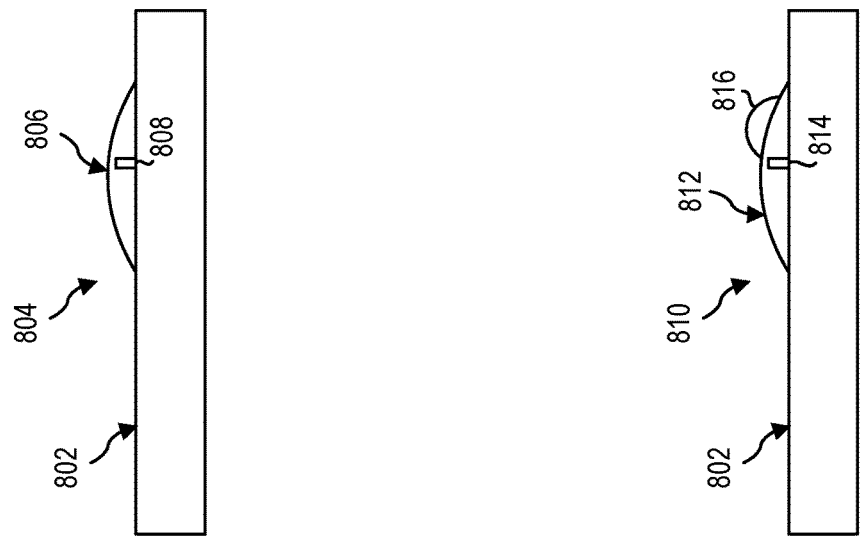
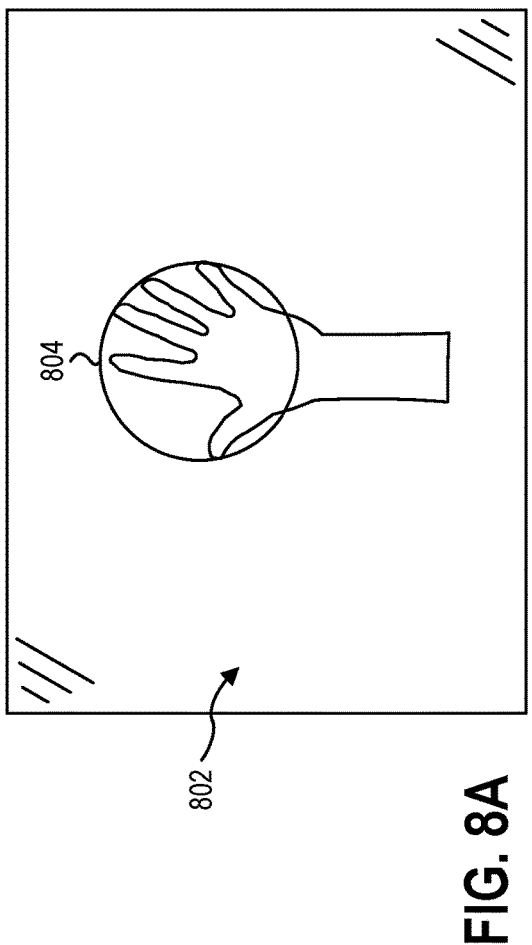
FIG. 8A
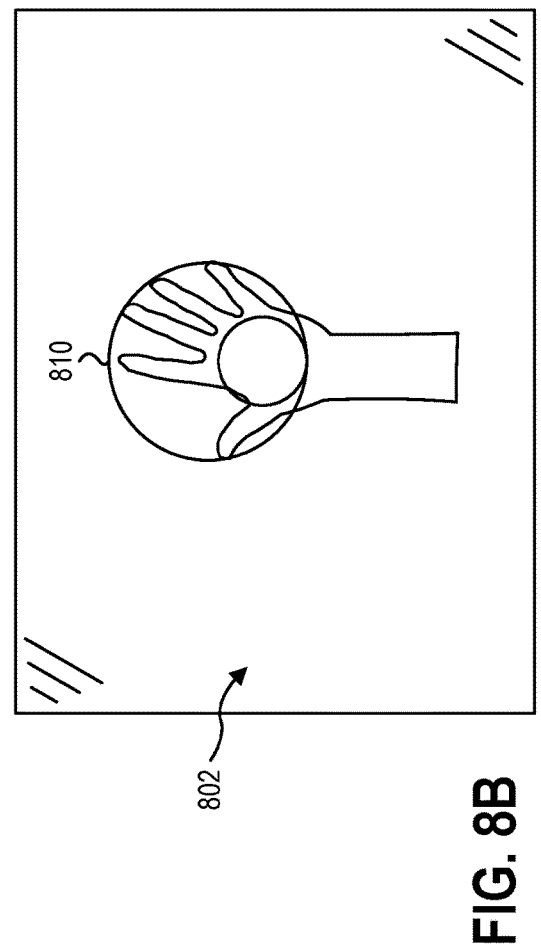
FIG. 8B

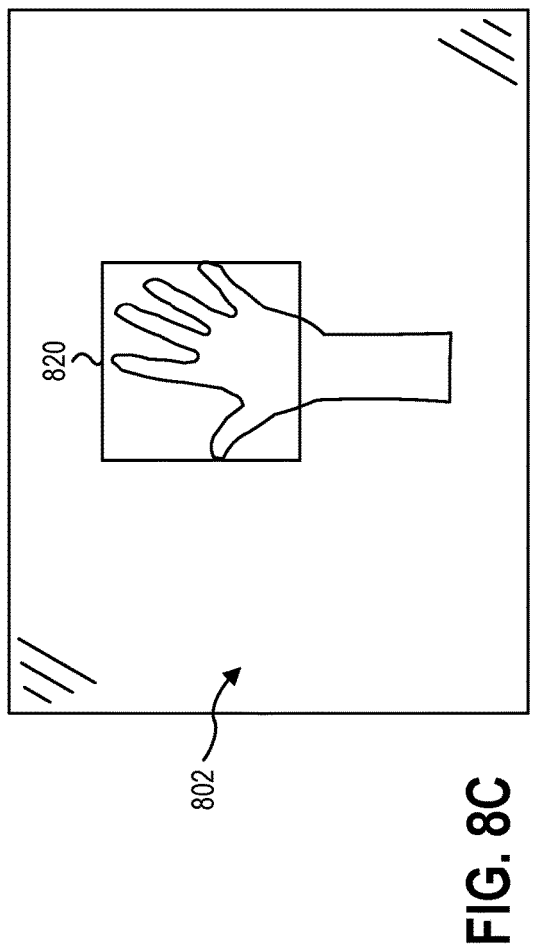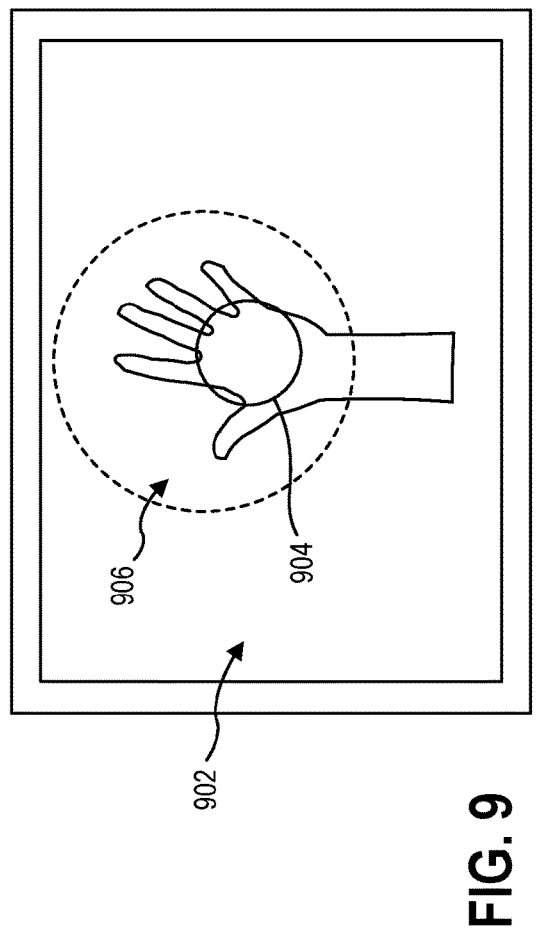
FIG. 8C
FIG. 9

SELF-CALIBRATING GESTURE-DRIVEN INPUT SYSTEM

PRIORITY CLAIMS

This application claims priority to U.S. Provisional Patent Application No. 62/546,434, titled "Scratch: A self-calibrating, gesture driven, text entry system for multitouch enabled devices," filed Aug. 16, 2017. This application also claims priority to U.S. Provisional Patent Application No. 62/643,358, titled "Scratch2: An extension to the Scratch, self-calibrating, gesture driven, text entry system," filed on Mar. 15, 2018. This application also claims priority to U.S. Provisional Patent Application No. 62/607,856, titled "Unified text-entry and pointing apparatus," filed on Dec. 19, 2017. Each of the aforementioned applications is incorporated herein in its entirety.

BACKGROUND

Recent years have seen an increase in computing systems that utilize touchscreen technology. Indeed, it is now common for portable and non-portable computing devices to utilize input interfaces that rely primarily on touch-based input received via a touchscreen or other touch-sensitive interface. Nevertheless, while conventional touch-based input interfaces provide a useful tool for receiving and processing user input, various problems and drawbacks exist with conventional touch-based interfaces.

For example, conventional touchscreens often fail to provide adequate space. For instance, as touchscreen interfaces become more complex, applications (e.g., digital keyboard applications) attempt to fit more and more inputs within a limited space, thereby increasing clutter as well as making it difficult to fully utilize the touchscreen interface. As a result of the increased clutter and complexity, conventional touch-based input systems often result in receiving incorrect inputs, inadvertent selection of multiple inputs, and other inefficiencies related to receiving and processing user inputs.

In addition to inefficiencies in the design of conventional input interfaces, conventional touch-based input systems generally fail to provide tactile and mechanical feedback that is often helpful to an end-user. Indeed, conventional input interfaces that include a mechanical keyboard and mouse provide tactile and mechanical feedback that enables a user to provide inputs and commands without frequently looking away from a screen to ensure that inputs are received correctly. In contrast, conventional touch-based input systems do not provide the same tactile and mechanical feedback. As a result, users often input incorrect commands and/or find themselves frequently looking away from a display area when interacting with the touch-based interface. As a result, conventional touch-based interfaces often result in a clunky or inefficient experience, particularly when utilizing on-screen keyboards or other more involved touch-based interfaces.

Moreover, conventional input interfaces fail to accommodate individual characteristics of end-users. For example, conventional touch-based interfaces are typically universal, providing the same size and orientation of input icons regardless of the size of an individual's hand or the preference of the individual with regard to which hand interacts with an interface. Moreover, conventional touch-based interfaces often fail to account for varying sizes and input capabilities of touch-based interfaces between different types of computing devices (e.g., mobile devices, tablets, hybrid touch-based and non-touch-based interfaces). As a result, conventional touch-based interfaces often fail to provide an effective interface for a large number of users that have large or small hands, have unconventional preferences (e.g., one-handed typing, left-handed typing, etc.) or that that use applications across multiple computing devices having different types of input interfaces.

These along with additional problems and issues exist with regard to conventional touch-based input systems.

BRIEF SUMMARY

Embodiments of the present disclosure provide benefits and/or solve one or more of the foregoing and other problems in the art with systems, methods, and computer-readable media that implement a self-calibrating, gesture-driven input system (or simply "gesture input system"). In particular, in one or more embodiments, the disclosed systems provide an intuitive gesture-driven input system that enables users to efficiently provide any number of inputs via a touch-based interface (e.g., a touchscreen interface). As an example, the disclosed systems provide a gesture-driven interface that enables a user to efficiently and flexibly input characters including text, numbers, symbols, and other input commands from a keyboard application using a number of finger-specific touch gestures. In addition, the disclosed systems prevent common errors by calibrating and recalibrating the gesture-driven interface to dynamically adapt to a size, placement, and orientation of one or more hands (or other input object). Moreover, the disclosed systems provide a self-calibrating gesture-driven input interface including features and functionality that accomplish benefits described herein across a number of different types of devices having various types of input interfaces.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 1A illustrates an example conventional touchscreen interface with an onscreen digital keyboard;

FIG. 1B illustrates an example gesture-driven touchscreen interface implemented by a gesture input system in accordance with one or more embodiments;

FIGS. 3A-3C illustrate an example calibration and recalibration of input zones on a gesture-driven touchscreen interface in accordance with one or more embodiments;

FIGS. 5A-5B illustrate example maps for implementing the gesture input system in accordance with one or more embodiments;

FIGS. 6A-6E illustrate an example determination of hand-orientation for input zones in accordance with one or more embodiments;

FIGS. 7A-7B illustrate an example calibration and recalibration of input zones on a gesture-driven touchscreen interface in accordance with one or more embodiments;

FIGS. 8A-8C illustrate example input systems including both touch-based and position-based input devices in accordance with one or more embodiments;

FIG. 9 illustrates another example input system including a touch-based input device and a position-based input device in accordance with one or more embodiments;

DETAILED DESCRIPTION

Figure 2B:
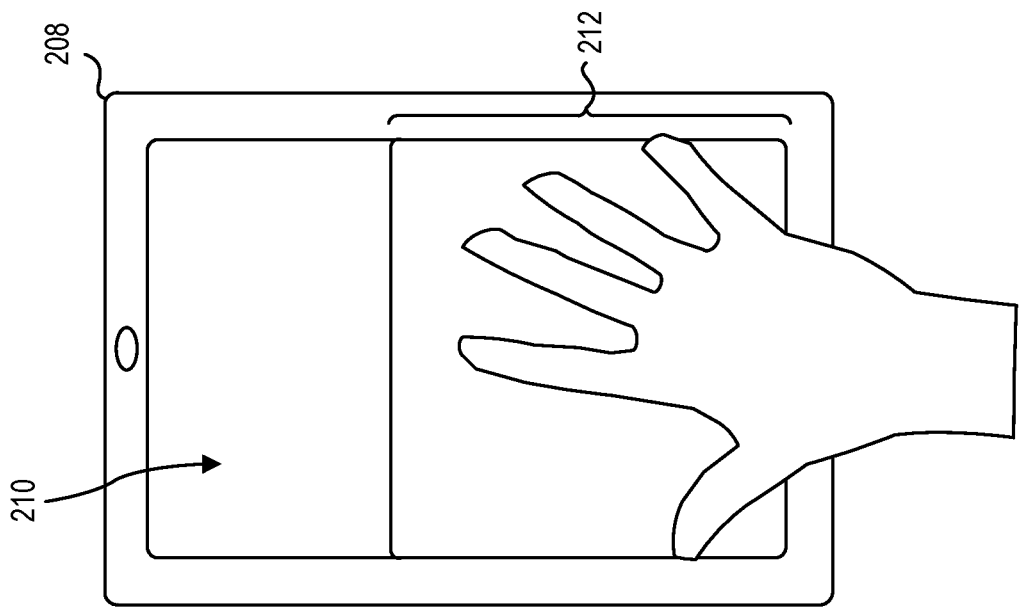
FIG. 2B illustrates another example gesture-driven touchscreen interface implemented by the gesture input system in accordance with one or more embodiments.

One or more embodiments of the present disclosure include a gesture input system that facilitates efficient and flexible entry of input commands using finger-specific touch-gestures. For example, the gesture input system can calibrate a touchscreen interface (or other touch-based input interface) by identifying a number of input zones corresponding to placement of fingers on a surface of the touchscreen interface. In particular, the gesture input system can detect a plurality of calibration gestures (e.g., touch-gestures) at points of contact on the touchscreen interface. Based on the detected calibration gestures, the gesture input system can further determine input zones corresponding to respective regions of the touchscreen interface. The gesture input system can further utilize an input map including a mapping between zone-specific touch-gestures and corresponding input commands (e.g., letters, numbers, symbols). As will be described in further detail below, the gesture input system can process input commands for corresponding touch gestures in accordance with the mapping between the input zones and corresponding input commands.

In addition to implementing finger-specific gesture-driven inputs, the gesture input system can additionally implement hand-specific gesture-driven inputs. For example, based on detecting a plurality of calibration gestures (e.g., three or more calibration gestures) at discrete positions on a touchscreen interface, the gesture input system can determine a hand orientation based on a central position (e.g., a centroid, a midpoint) on the touchscreen interface relative to the positions of the three or more calibration gestures. In addition, based on the determined hand orientation, the gesture input system can determine input zones corresponding to respective regions of the touchscreen interface. Furthermore, similar to the example described above, the gesture input system can utilize an input map and process input commands for corresponding touch gestures in accordance with a mapping between the input zones (e.g., the hand-orientation-specific input zones) and corresponding input commands.

As mentioned above, the gesture input system can provide a self-calibrating gesture-driven input interface that includes features and benefits across a number of different types of computing devices. For example, in one or more embodiments, the gesture input system includes an input apparatus including a touch-based input device having a touch-based interface (e.g., a touchscreen, trackpad) and a position-based input device that includes a non-touch-based interface (e.g., an optical mouse, roller ball, hand-held wand). Similar to examples discussed above, the gesture input system can detect a plurality of calibration gestures via the touch-based interface and determine input zones corresponding to regions of the touch-based interface. In addition, the gesture input system can detect touch gestures and process input commands for the touch gestures in accordance with an input map that includes a mapping between the input zones and input commands.

As will be described in further detail below, the gesture input system provides a number of advantages over conventional input systems. For example, by determining a plurality of input zones based on a plurality of detected calibration gestures, the gesture input system can identify regions of a touchscreen interface uniquely sized and positioned for a particular user that enables the user to efficiently and flexibly interact with the touchscreen interface. As another example, by determining one or more hand-orientations based on positions of a plurality of detected calibration gestures, the gesture input system can enable a user to intuitively utilize a gesture-driven digital keyboard that incorporates both hand-specific and finger-specific input zones.

In addition, as will be described in further detail below, the gesture input system can periodically recalibrate placement of the input zones on a touch-based interface to increase accuracy of detecting and processing input commands using the gesture-driven input system. For example, by detecting a shift in position of one or more touch gestures corresponding to one or more previously defined input zones, the gesture input system can recalibrate or otherwise modify the input zones in accordance with movement or rotation of a user's hands. In this way, and as will be described in further detail below, the gesture input system facilitates calibration and recalibration of the input zones across a number of different types of devices including smartphones, tablets, or other mobile devices as well as computing devices that include a combination of position-based input devices (e.g., a mouse, tracking ball) and touch-based input devices (e.g., touch-sensitive mouse, trackpad, touchscreens).

As illustrated by the foregoing discussion, the present disclosure utilizes a variety of terms to described features and advantages of the gesture input system. Additional detail is now provided regarding the meaning of many of these terms.

For instance, as used herein, a "touch-based interface" refers to one or more devices capable of detecting one or more touch gestures. In one or more embodiments, a touch-based interface refers specifically to a touchscreen interface. As used herein, a "touchscreen interface" refers to a display device (e.g., a touchscreen, a monitor) capable of detecting one or more touch gestures in addition to providing a display of digital content (e.g., documents, files, digital images, digital videos, etc.) For example, a touchscreen interface may refer to an input interface that includes both a graphical user interface and a touchscreen device. Alternatively, in one or more embodiments described herein, a touch-based interface may refer to various types of touch-sensitive devices including, by way of example, a trackpad, touch-sensitive mouse, or other touch-sensitive device that does not necessarily provide a display of digital content.

As used herein, a "touch gesture" refers to a single or multi-touch input where one or more points of contact with a touch-sensitive surface are detectable by a computing device. In one or more embodiments, a touch gesture refers specifically to a tap, swipe, long-press, or other type of touch gesture that the computing device can detect and distinguish from other types of touch gestures. As will be described in further detail below, the gesture input system can detect various types of touch gestures including calibration gestures, recalibration gestures, tap and/or swipe gestures, long-presses, or other types of touch gestures.

As used herein, a "calibration gesture" refers specifically to a touch gesture used for identifying one or more input zones on a touch-based interface. For example, a calibration gesture may refer to placement of a finger or other object in contact with a touchscreen interface for the purpose of establishing an initial hand position and defining input zones within which the gesture input system can detect touch gestures and process corresponding input commands.

As used herein, an "input zone" refers to a region of a touch-based interface within which touch gestures can be detected and processed in accordance with a mapping between the input zone and corresponding input commands. For example, an input zone may refer to a discrete portion of a touch-based interface defined by a boundary. Additional detail in connection with calibration gestures and input zones are provided below.

As used herein, an "input command" can refer to any type of user input. For example, an input command can refer to a letter, number, symbol, or other keyboard command associated with a corresponding key of a digital keyboard application. An input command can refer to a single command (e.g., a single letter, number, or symbol) or, alternatively, may refer to multiple commands (e.g., a word, phrase, or series of inputs). Accordingly, while one or more embodiments described herein relate specifically to input commands as corresponding to individual keys or icons on a digital keyboard application, it will be understood that an input command can refer to multiple inputs or a distinct series of inputs having an associated function.

Additional detail will now be provided regarding the gesture input system in relation to illustrative figures portraying example embodiments. For example, FIGS. 1A-1B illustrate example input interfaces that enable a user to provide one or more input commands to a computing device. For instance, FIG. 1A illustrates a first client device 102 (e.g., a tablet, touchscreen monitor) including a touchscreen interface 104. As shown in FIG. 1A, the touchscreen interface 104 includes a display of a conventional on-screen keyboard 106 including displayed icons associated with corresponding key commands (e.g., letters, numbers). In this example, a user of the client device 102 can type one- or two-handed by tapping the displayed icons at fixed locations on the touchscreen interface 104.

Similarly, FIG. 1B illustrates a second client device 108 (e.g., a tablet) for implementing the gesture input system in accordance with one or more embodiments. As shown in FIG. 1B, the second client device 108 includes a touchscreen interface 110 including an input area 112. In contrast to the on-screen keyboard 106 of FIG. 1A, the gesture input system detects touch gestures and processes corresponding input commands in accordance with one or more embodiments described herein. In particular, as will be described in detail herein, the gesture input system can identify specific input zones within the input area 112 mapped to specific input commands that enable a user of the client device 108 to use one or both hands to perform various touch gestures to type keyboard commands or otherwise provide input commands to the client device 108.

Figure 2A:
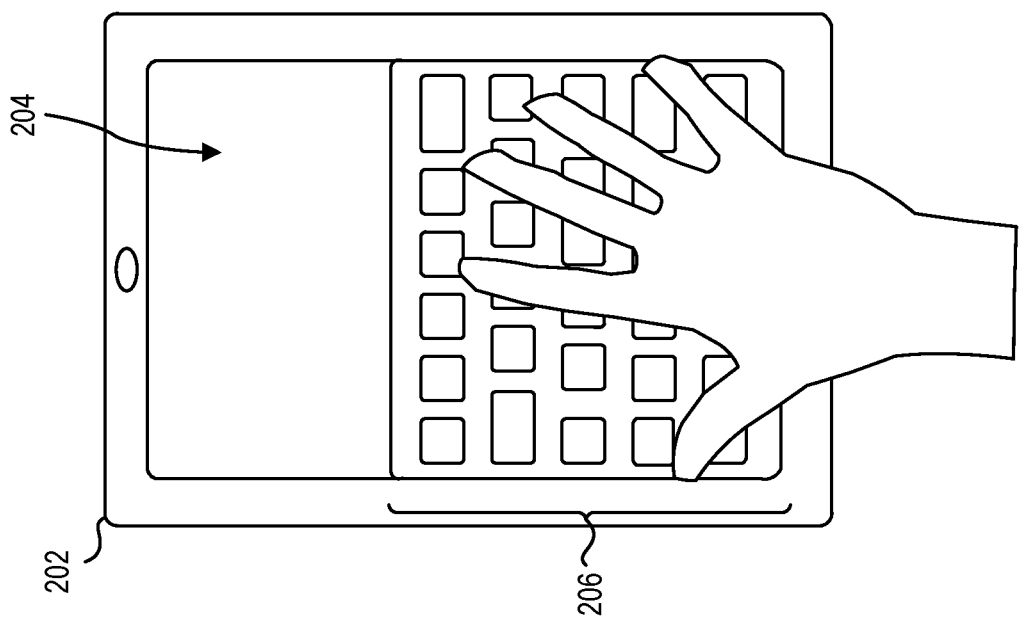
FIG. 2A illustrates another example conventional touchscreen interface with an onscreen digital keyboard.

FIGS. 2A-2B illustrate additional examples of input interfaces that enable a user to interact with and provide user inputs to a computing device. In particular, FIG. 2A illustrates an example mobile device 202 (e.g., a smartphone) including a touchscreen interface 204. As shown in FIG. 2A, the touchscreen interface 204 includes a display of a conventional on-screen keyboard 206 including displayed icons associated with corresponding key commands. In this example, a user of the mobile device 202 can type one-handed by tapping the displayed icons at fixed positions using the on-screen keyboard 206.

Similarly, FIG. 2B illustrates a second mobile device 208 (e.g., a smartphone) for implementing the gesture input system in accordance with one or more embodiments. As shown in FIG. 2B, the second mobile device 208 includes a touchscreen interface 210 including an input area 212 similar to the input area 112 shown in FIG. 2B. As will be described in further detail herein, the gesture input system can identify specific input zones within the input area 212 mapped to specific input commands that enable a user of the mobile device 208 to perform various touch gestures to type keyboard commands or otherwise provide mapped input commands to the mobile device 208.

While FIGS. 1A-2B illustrate example client devices having touchscreen interfaces for implementing the gesture input system in accordance with one or more embodiments, it will be understood that various types of client devices may incorporate different types of touch-based interfaces to implement one or more embodiments of the gesture input system described herein. For example, the gesture input system may utilize pressure or touch sensors that detect physical contact, proximity, configuration, position, and/or movement of fingers or mechanical input devices (e.g., styluses). As another example, the gesture input system can utilize electromagnetic sensors (e.g., utilizing visible or non-visible wavelengths of the electromagnetic spectrum) to detect various touch gestures. As another example, the gesture input system can utilize vibration detecting sensors, such as sound sensors (e.g., to detect sound within or without the audible spectrum) to detect various touch gestures. As yet another example, the gesture input system can utilize glove-based technologies capable of capturing and encoding multi-finger gestures or actions. Accordingly, while one or more embodiments described herein relate specifically to a gesture input system implemented in conjunction with a touchscreen interface, touch-sensitive mouse, trackpad, or other specific type of touch-sensitive input device(s), similar features and functionality described in connection with individual examples and embodiments can apply to other types of touch-sensitive input devices.

Moreover, while FIGS. 1A-2B (and other illustrated examples) illustrate examples including specific types of client devices for implementing the gesture input system, the gesture input system may be implemented on various types of computing devices. For example, as used herein, a client device may refer to a mobile device such as a mobile telephone, a smartphone, a PDA, tablet, or a laptop. Additionally, or alternatively, a client device may refer to a non-mobile device such as a desktop computer or television. Furthermore, while one or more embodiments described herein relate specifically to a gesture input system implemented locally on a client device (e.g., a gesture input application or plugin installed locally on the client device), one or more embodiments of the gesture input system may be implemented on a server device that provides features and functionality described herein remotely via a network or other remote connection between the server and client device(s). Additional detail regarding client devices and other computing devices is provided below (e.g., in relation to FIG. 12).

Figure 3C:
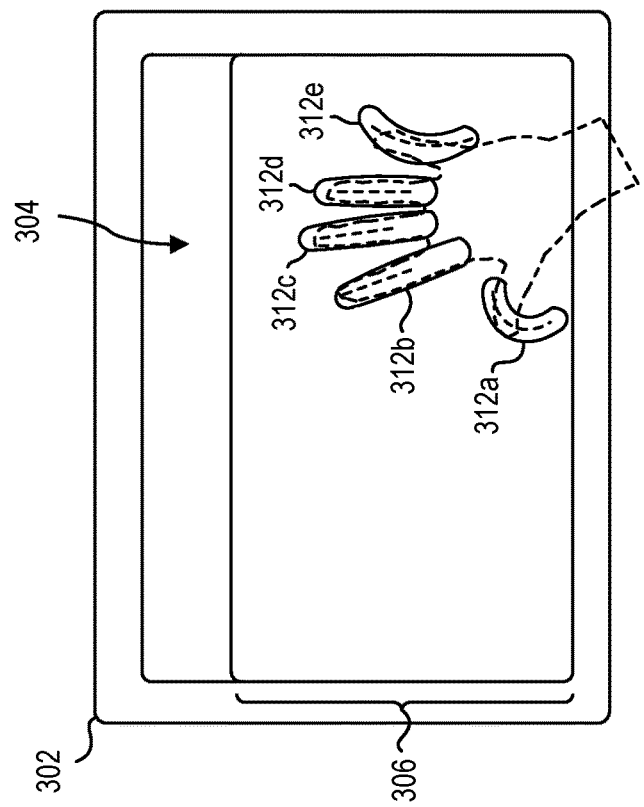

Proceeding onto FIGS. 3A-3C, the gesture input system can define or otherwise determine input zones corresponding to regions of a touchscreen interface based on one or more calibration gestures. For example, FIG. 3A illustrates an example client device 302 including a touchscreen interface 304 and display area 306 similar to one or more embodiments described above. As shown in FIG. 3A, the gesture input system can detect calibration gestures based on points of contact 308a-e by a hand coming into contact with the touchscreen interface 304. In one example, the gesture input system detects a plurality of calibration gestures by detecting five tap gestures at the points of contact 308a-e. In one or more embodiments, the gesture input system can detect calibration gestures at any point within the touchscreen interface 304. Alternatively, the gesture input system can detect calibration gestures within a specific display area 306. It will be understood that one or more embodiments herein refer to detecting calibration gestures and defining input zones within a designated display area 306. Nevertheless, it will be understood that the gesture input system can detect calibration gestures and define the input zones at any point within the touchscreen interface 304 (e.g., as shown in FIGS. 7A-7B below).

The gesture input system can detect calibration gestures in a number of ways. For instance, the gesture input system can identify a calibration event by detecting a predefined combination of touch gestures that the gesture input system recognizes as calibration gestures. As an example, the gesture input system can detect a plurality of simultaneously detected touch gestures (e.g., a five- or ten-finger tap gesture or long press) on the touchscreen interface 304. As another example, the gesture input system can detect a long press gesture (e.g., by a user's thumb) in combination with a tap gesture of one or more additional fingers. In one or more embodiments, the gesture input system provides a prompt to a user to place any number of fingers (or the entire hand) in contact with the touchscreen interface 304 (e.g., within the display area 306) and recognizes any touch gestures received during a predefined duration of time (e.g., a calibration period) as calibration gestures for use in establishing one or more input zones within the touchscreen interface 304.

Based on the received calibration gestures at the corresponding points of contact 308a-e, the gesture input system can define or otherwise determine input zones 310a-e corresponding to regions (e.g., discrete, non-overlapping regions) of the touchscreen interface 304. As mentioned above, the input zones 310a-e can refer to discrete regions of the touchscreen interface 304 within which certain touch gestures (e.g., tap gestures, swipe gestures) can be detected and processed in accordance with a mapping between the input zone and corresponding input command. Accordingly, a tap gesture received within the first input zone 310a may be recognized as a first input command while a tap gesture received within the second, third, fourth, or fifth input zones 310b-e may be recognized as different input commands (e.g., depending on a mapping for the respective input zones). Additional detail with regard to mapping of input zones and input commands is provided in further detail below (e.g., in connection with FIGS. 5A-5B).

As shown in FIG. 3A, the gesture input system defines the input zones 310a-e by identifying regions within the touchscreen interface 304 where touch gestures are expected to be received by corresponding fingers. For example, the gesture input system can define a circle, oval, or other shaped region around the points of contact 308a-e of the calibration gesture(s) based on an assumption that touch gestures from the corresponding fingers will likely be received within the regions defined by the input zones 310a-e. Accordingly, in one or more embodiments, the gesture input system may recognize any touch gesture detected within the corresponding input zones 310a-e as a touch gesture for the corresponding finger. For instance, the gesture input system may recognize any tap gesture within the first input zone 310a as a touch gesture from the thumb of the hand.

As further shown, the gesture input system may define the input zones 310a-e differently based on the corresponding fingers. For example, because the thumb generally moves along a different axis when performing a swipe gesture (or other directional touch gesture) than other fingers on the hand, the gesture input system may account for the different predicted movement of the fingers in defining the input zones 310a-e. Thus, as shown in FIG. 3A, the first input zone 310a corresponding to the thumb can have a different orientation and shape than the orientation and shape of the other input zones 310b-e based on predicted paths of the fingers when performing various touch gestures (e.g., as indicated by the dotted lines). In one or more embodiments, the gesture input system observes a history of touch gestures by a particular user (or on a particular device) and defines the input zones 310a-e in accordance with the history of touch gestures to better fit the preferences of the user or client device 302.

As mentioned above, the gesture input system can additionally recalibrate the position of the input zones 310a-e. For example, as shown in FIGS. 3B-3C, the gesture input system can detect a shift in a position of the hand relative to a position of the input zones 310a-e. Rather than misinterpreting touch gestures as the fingers inadvertently move between input zones 310a-e, the gesture input system can recalibrate the input zones to reflect a new position of the hand on the touchscreen interface. In particular, as shown in FIG. 3C, upon detecting a shift in the hand position, the gesture input system can define or otherwise determine updated input zones 312a-e that reflect the new position of the hand on the touchscreen interface 304.

In one or more embodiments, the gesture input system recalibrates the input zones in response to detecting a recalibration event. For example, the gesture input system can detect a shift in position of one or more touch gestures on the touchscreen interface 304 with respect to the input zones 310a-e. For instance, where subsequently detected touch gestures are at different locations and/or where one or more touch gestures start approaching the edge of an input zone 310a-e, the gesture input system may determine that recalibration is needed and update the input zones to better reflect more recent instances of touch gestures from the corresponding fingers.

In one or more embodiments, rather than monitoring location of touch gestures for each of the input zones 310a-e, the gesture input system may monitor movement of one or two of the input zones and determine whether recalibration is needed based on movement of inputs within (or without) those input zones. For example, the gesture input system may monitor movement of the outer input zones (e.g., the first input zone 310a and the fifth input zone 310e) to determine whether a shift in position of the zone-specific touch gestures have occurred and whether recalibration of the input zones should be performed.

As another example, the gesture input system may determine whether a shift of the touch gestures in relation to the input zones 310a-e has occurred based on movement of the touch gestures relative to an anchor point on the touchscreen interface 304. For example, in one or more embodiments, the thumb (or other finger) may remain in contact with the touchscreen interface 304, serving as a fixed point on the touchscreen interface 304 for recalibration of the other input zones. The gesture input system may detect rotation of touch gestures relative to the anchor point and, based on the detected rotation, redefine or otherwise update the position of the input zones to reflect the detected rotation. Alternatively, the gesture input system may detect movement of the anchor point (e.g., a shift in placement of the thumb on the touchscreen interface 304) and determine an updated placement of the input zones in response to detecting the movement of the anchor point.

In one or more embodiments, the gesture input system may recalibrate the input zones based on detecting one or more recalibration inputs. For example, the gesture input system may designate or otherwise identify one or more touch gestures corresponding to specific input commands such as a "space" command or an "enter" command (or other commonly detected input command) as recalibration inputs and monitor placement of touch gestures corresponding to those commands to determine whether recalibration is necessary. For instance, the gesture input system may detect a shift in position of two or more subsequent gestures designated as recalibration inputs and shift the position of the input zones in response to detecting one or more instances of the recalibration inputs.

As another example, the gesture input system may periodically recalibrate the input zones at a predefined frequency (e.g., every few seconds) to ensure that the input zones correspond to a present position of the fingers. For example, every few seconds (or any fixed duration of time), the gesture input system may identify the most recently received touch gesture for each of the input zones and define the input zone in accordance with the most recently received touch gesture(s).

Figure 4:
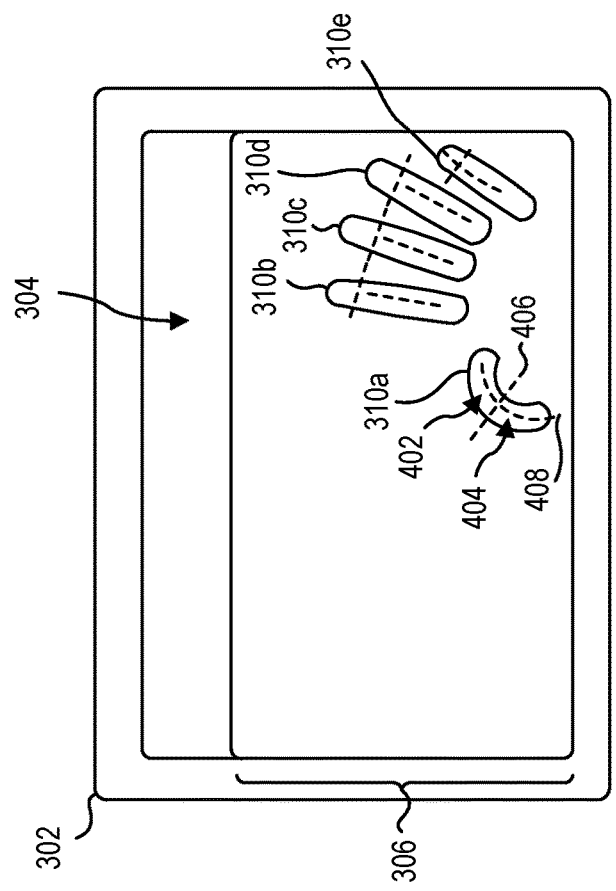
FIG. 4 illustrates an example calibration of input zones including subzones in accordance with one or more embodiments.

In addition to determining and recalibrating input zones, the gesture input system can additionally define one or more subzones within respective input zones. For example, FIG. 4 illustrates the client device 302 including the touchscreen interface 304 and input area 306 in accordance with one or more embodiments described herein. FIG. 4 additionally shows defined input zones 310a-e in accordance with one or more embodiments described above. As shown in FIG. 4, the gesture input system can define multiple subzones within each of the input zones 310a-e in which the respective subzones are mapped to corresponding input commands.

In particular, with respect to the first input zone 310a, the gesture input system can define a first subzone 402 and a second subzone 404 separated by a subzone boundary 406 that passes through or otherwise traverses the first input zone 310a. As further shown, the gesture input system can define a swiping path 408 that passes through at least a portion of the first input zone 310a. In receiving touch gestures within the input zone 310a, the gesture input system can identify and execute a first input command in response to detecting a touch gesture (e.g., a tap gesture) within the first subzone 402. In contrast, the gesture input system can identify and execute a second input command in response to detecting a touch gesture (e.g., a tap gesture) within the second subzone 404. Moreover, the gesture input system can identify and execute a third input command in response to detecting a directional touch gesture (e.g., a swipe gesture) along the swiping path 408 (e.g., within one of the subzones 402, 404 or at any location within the input zone 402). Accordingly, in at least one example, the gesture input system may recognize four distinct input commands corresponding to taps in the respective subzones 402, 404 and directional swipe gestures (e.g., up or down) along the swiping path 408. In another example, the gesture input system may recognize six input commands for an input zone corresponding to tap and directional swipe gestures (e.g., up or down) within each of the defined subzones.

It will be understood that each of the input zones 310a-e can similarly include two or more subzones and swiping paths similar to the subzones 402, 404 and swiping path 408 of the first input zone 310a. In addition, the gesture input system may similarly define or otherwise determine subzones and swiping paths for input zones of a second hand (not shown) in contact with the touchscreen interface 304 (e.g., within the input area 306).

As mentioned above, the gesture input system can identify different input commands to execute or otherwise process based on whether a touch gesture is detected within one or more specific input zones as well as a mapping between the input zones and one or more input commands. In one or more embodiments, the gesture input system identifies the specific input commands in accordance with an input map that includes a mapping between the input zones and corresponding input commands. More specifically, the input map can include a mapping between input commands and corresponding zone-specific touch gestures.

FIGS. 5A-5B illustrate example input maps in accordance with one or more embodiments. In particular, as discussed in one or more examples above, the gesture input system can access an input map to determine which input command to perform in response to detecting a zone-specific touch gesture. In one or more embodiments, the gesture input system stores the input map(s) on a local device (e.g., on a local storage of a client device) for determining input commands to execute in response to detecting various finger-specific touch gestures. Alternatively, the gesture input system can remotely access the input map(s) (e.g., on a server) in determining which input command to perform in response to a detected touch gesture.

FIG. 5A illustrates a first example input map 502 including a mapping between keyboard commands and corresponding touch gestures. As shown in FIG. 5A, the input map 502 including a two-handed mapping between finger and hand-specific touch gestures and corresponding input commands. In particular, the input map 502 includes a mapping for each of five fingers (labeled as 0-4) corresponding to respective fingers of a hand. While not shown in FIG. 5A, the gesture input system can utilize a one-handed mapping including finger-specific touch gestures for a single-hand corresponding to any number of input commands.

As illustrated in FIG. 5A, the input map 502 includes single-gesture mappings 504 that include mappings between single-zone (e.g., single-finger) touch gestures and corresponding keyboard commands. In particular, as shown in the input map 502, a tap gesture, a down-swipe gesture, or an up-swipe gesture for the single-gesture mappings 504 are each mapped to a single keyboard command. By way of example, for touch gestures detected within input zone "4" for the left hand (e.g., corresponding to the left pinky finger), a tap gesture is mapped to an "r" keyboard command, a down-swipe gesture is mapped to a "y" keyboard command, and an up-swipe gesture is mapped to a "q" keyboard command. As another example, for touch gestures detected within input zone "0" for the right hand (e.g., corresponding to the right thumb), a tap gesture is mapped to a "period" keyboard command, a down-swipe gesture is mapped to a "comma" keyboard command, and an up-swipe gesture is mapped to a "tab" keyboard command. Other single-zone touch gestures are illustrated within the input map 502.

As further shown in FIG. 5A, the input map 502 includes a number of multi-gesture mappings 506 that include mappings between multi-zone (e.g., multi-finger) touch gestures and corresponding keyboard commands. In particular, as shown in the input map 502, simultaneous tap gestures, down-swipe gestures, or up-swipe gestures for the multi-gesture mappings 506 are mapped to a corresponding keyboard command. By way of example, for tap gestures detected within both zones "1" and "2" (e.g., corresponding to the index finger and middle finger) for the left hand, two tap gestures are mapped to an "e" keyboard command, two down-swipe gestures are mapped to an "h" keyboard command, and two up-swipe gestures are mapped to a "w" keyboard command. As another example, for touch gestures detected (e.g., simultaneously detected) within each of zones "1," "2," "3," and "4" (e.g., corresponding to all fingers except the thumb) for the right hand, four tap gestures are mapped to a "j" keyboard command, four down-swipe gestures are mapped to a "space" keyboard command, and four up-swipe gestures are mapped to a "shift" keyboard command.

Moreover, while the input map 502 specifically groups left-handed and right-handed gestures together in mapping multiple touch gestures to corresponding input commands, an input map may similarly map combinations of touch gestures for both hands to corresponding input commands. As an example, an input map may include a mapping of two tap gestured detected from each of zone "0" for both the left and right hand (or other combination of touch gestures from different hands) to a corresponding input command.

FIG. 5B illustrates another example input map 510 including similar features and functionality as the input map 502 described above in connection with FIG. 5A. For example, the input map 510 shown in FIG. 5B includes a mapping between single and multiple touch gestures for respective input zones and corresponding keyboard commands. Also similar to the input map 502, the input map 510 includes mappings for input zones corresponding to specific hands.

As further shown in FIG. 5B, the input map 510 includes mappings between subzones of the input zones and corresponding keyboard commands. In particular, as shown in FIG. 5B, the input map 510 includes mappings between upper and lower subzones and respective keyboard commands. By way of example, zone "4" of the left hand includes an upper subzone and a lower subzone that include subzone-specific mappings to corresponding keyboard commands. For instance, a tap gesture for the upper subzone of zone "4" is mapped to an "r" keyboard command while a tap gesture for the lower subzone of zone "4" is mapped to a "y" keyboard command. Similarly swipe gestures for the corresponding subzones are mapped to different keyboard commands. Accordingly, the gesture input system can interpret different types of gestures detected within the corresponding subzones differently, even within the same input zones.

In addition, while FIGS. 5A-5B illustrate input maps that specifically map zone-specific touch gestures to keyboard commands, it will be understood that the gesture input system can utilize input maps that map zone-specific touch gestures to various types of input commands. Furthermore, while the input maps shown in FIGS. 5A-5B illustrate mappings of one or multiple touch gestures to single keyboard commands, the gesture input system can utilize input maps that map single touch gestures (or multiple touch gestures) to multiple input commands. For example, an input map may include a mapping of a single touch gesture (or multiple simultaneously detected touch gestures) to an entire word, a string of multiple characters, or a combination of multiple input commands.

As discussed above, the gesture input system can differentiate between gestures performed by different hands. Indeed, where a touchscreen interface includes an input area large enough for placement of both hands simultaneously, the gesture input system can differentiate based on the placement of the hands at left and right portions of the input area. Similarly, even where a user only uses one hand at a time, the gesture input system can differentiate between left and right-handed gestures based on a location on the touchscreen interface where the user places their hands. Accordingly, when a user places their hand on a right side of the input area or touchscreen interface, the gesture input system may identify right-handed mappings in determining corresponding input commands for touch gestures. Alternatively, when the user places their hand on a left side of the input area or touchscreen interface, the gesture input system may identify left-handed mappings in determining corresponding input commands.

While the input maps described above in connection with FIGS. 5A-5B relate specifically to input maps for a two-handed keyboard application, one or more embodiments of the gesture input system may generate, identify, or otherwise access an input map including mappings for a single hand (e.g., a single-hand keyboard application). In addition, to improve upon the intuitive nature of mapping touch gestures to corresponding input commands, the gesture input system may utilize a different input map depending on whether a user uses their left or right hand in interacting with a touch-sensitive interface. Accordingly, one or more embodiments described below (e.g., in connection with FIGS. 6A-6E) may refer to determining a hand-orientation for use in determining whether to use mapping data specific to left or right-handed gestures (e.g., for identifying mappings within two-handed input maps similar to those described in FIGS. 5A-5B) or, alternatively, for identifying an input map keyed specifically for a right or left hand (e.g., for a smaller one-handed input interface).

As an alternative to distinguishing between left and right-handed gestures based on a location where the user places their hands, the gesture input system can distinguish between right and left-handed gestures based on an orientation or relative placement of the calibration gestures. For example, FIGS. 6A-6D illustrate an example in which the gesture input system determines a hand-orientation based on a central position on a touchscreen interface relative to the positions (e.g., points of contact) of detected calibration gestures. In particular, FIGS. 6A-6D illustrate the client device 302 including the touchscreen interface 304 and input area 306 similar to one or more embodiments described above.

As shown in FIG. 6A, the gesture input system can identify points of contact 602a-e corresponding to positions of the touchscreen interface 304 where fingers of the user's hand come into contact with the touchscreen. For example, the gesture input system can detect a long press, a five-finger tap gesture, or other calibration gesture(s) where a plurality of points of contact are detected by the gesture input system. While FIG. 6A illustrates an example in which all five fingers interact with the touchscreen interface 304, other embodiments may include fewer (e.g., three or more) points of contact or additional points of contact (e.g., ten fingers) detected by the gesture input system. Indeed, the gesture input system can identify any number of points of contact where a certain combination of gestures is recognized as a combination of calibration gestures.

Where the gesture input system recognizes the combination of touch gestures as calibration gestures, the gesture input system may classify the points of contact 602a-e as calibration events and identify a centroid 604 for the points of contact 602a-e. For example, as shown in FIG. 6B, the gesture input system can identify a centroid 604 corresponding to a center of mass for the points of contact 602a-e on the touchscreen interface 304.

Upon identifying the centroid 604, the gesture input system can further determine angles between each of the calibration events. For example, as shown in FIG. 6C, the gesture input system can identify centroid angles 606a-e between each of the points of contact 602e relative to the centroid 604. For instance, in the example illustrated in FIG. 6C, the gesture input system identifies a first centroid angle 606a between the first point of contact 602a and the second point of contact 602b, a second centroid angle 606b between the second point of contact 602b and the third point of contact 602c, and so on until centroid angles have been determined between each point of contact positioned clockwise around the centroid 604.

Upon determining the centroid angles 606a-e between the points of contact 602a-e relative to the centroid 604, the gesture input system can identify a central point between a selected two of the points of contact 602a-e. In particular, as shown in FIG. 6D, the gesture input system can identify a midpoint 608 between the first point of contact 602a and the fifth point of contact 602e based on a determination that the fifth centroid angle 606e is the largest of the determined centroid angles 606a-e between the points of contact 602a-e. Indeed, in a five-finger configuration, the gesture input system can assume that the first point of contact 602a and the fifth point of contact 602e correspond to the thumb and pinkie (though which point of contact specifically corresponds to the thumb and pinkie may still be unknown) based on the determination that the fifth centroid angle 606e is the largest of the determined angles 606a-e between the points of contact 602a-e.

Upon identifying the midpoint 608, the gesture input system can determine a number of midpoint angles 610a-e between the points of contact 602a-e relative to the midpoint 608. As illustrated in FIG. 6D, a fifth midpoint angle 610e between the first point of contact 602a and fifth point of contact 602e is 180 degrees and the largest of the determined midpoint angles 610a-e. Accordingly, the gesture input system can determine the second biggest midpoint angle (in this example corresponding to the first midpoint angle 610a between the first point of contact 602a and the second point of contact 602b) and determine a hand orientation for the detected calibration gestures based on the second biggest midpoint angle from the determined midpoint angles 610a-e relative to the midpoint 608 (which the gesture input system assumes, in this case, to correspond to an angle between the thumb and index finger). It will be understood that the gesture input system can utilize other algorithms to determine a hand-orientations. For example, the gesture input system can utilize different algorithms based on a number of calibration inputs (e.g., a three-finger orientation, a four-finger orientation, etc.)

Accordingly, based on the relative position and measurements of the determined angles 610a-e relative to the midpoint 608, centroid 604, or other central point relative to the points of contact 602a-e, the gesture input system can assume that the first point of contact 602a corresponds to a thumb, the second point of contact 602b corresponds to an index finger, and so on. Based on this determination, the gesture input system can determine that a right-hand orientation should be applied. Based on this determination, the gesture input system can determine a size and shape of the input zones. In addition, the gesture input system can determine a corresponding input map including a mapping between zone-specific touch gestures and corresponding input commands.

In addition to mapping zones corresponding to the points of contact 602a-e to hand-specific input commands (e.g., based on a determined hand-orientation), the gesture input system can additionally utilize the points of contact 602a-e to define the input zones. For example, while one or more embodiments described above describe the input zones in terms of oval shaped regions, FIG. 6E illustrates a non-limiting example in which the gesture input system defines the input zones as radially extending regions of the touchscreen interface 304 based on the discrete locations of the points of contact 602a-e.

Figure 6E:
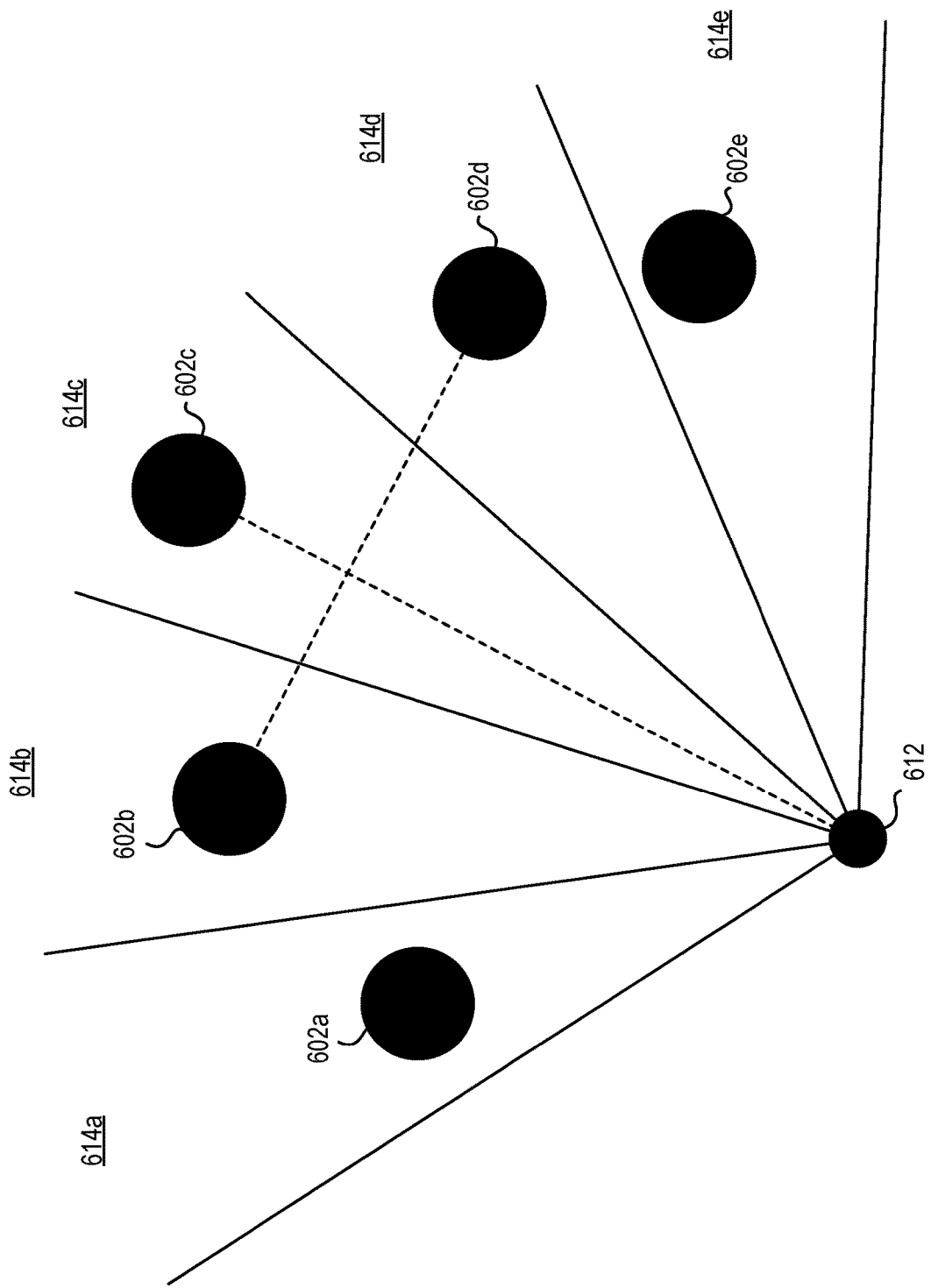

For example, as shown in FIG. 6E, the gesture input system can identify a first line extending between the second point of contact 602b (e.g., corresponding to the index finger) and the fourth point of contact (602d (e.g., corresponding to the ring finger). The gesture input system can further identify a second line extending from the third point of contact 602c (e.g., corresponding to the middle finger) perpendicularly through the first line to a calibration origin 612. The gesture input system may identify the calibration origin 612 at a variety of points relative to the points of contact 602a-e. For example, the gesture input system may identify the calibration origin 612 at a point generally corresponding to the position of an individual's wrist. The gesture input system may alternatively identify the calibration point 612 at a predefined distance from the third point of contact 602c. In one or more embodiments, the gesture input system can identify the calibration point 612 based on a history of zone-specific touch gestures to fine-tune or otherwise refine determination of the input zones for a particular user or client device. As another example, the gesture input system may identify the calibration point 612 at a distance from the third point of contact 602c based on a ratio to the distance between the second point of contact 602b and the fourth point of contact 602d.

Upon identifying the calibration origin 612, the gesture input system can determine the input zones by defining input regions 614a-e mapped to corresponding input commands (e.g., similar to other examples of the input zones described herein). For example, the gesture input system can define the input regions 614a-e based on lines or boundaries extending radially from the calibration origin 612, as shown in FIG. 6E. By defining the input regions 614a-e in this way, the gesture input system may recognize a larger range of finger-specific input gestures, thus increasing the flexibility of implementing the self-calibrating gesture-driven input systems described herein.

While FIG. 6E illustrates an example in which the gesture input system determines a hand-orientation and defines input zones specific to a five-finger orientation, similar features and principles may apply to determining a hand-orientation and/or defining input zones for other hand orientations or finger configurations. Indeed, where a mobile device or other touch-sensitive interface includes limited space where five or ten fingers would be impractical, the gesture input system may define input zones for finger configurations including fewer than five fingers. As an example, where the gesture input system anticipates that a user of a mobile device (or other touch-sensitive interface) will use three fingers (e.g., as opposed to five or ten fingers) and where the gesture input system has access to an input map including mapping information between touch gestures for three fingers and corresponding input commands, the gesture input system can determine input zones for three fingers rather than five or ten fingers as described in one or more examples above.

In determining input zones for three fingers, the gesture input system can determine input zones in a variety of ways. For example, in this or other examples described herein, the gesture input system may provide a selectable option that enables a user to select a setting or otherwise manually indicate which hand will be used in providing touch-based gestures. Based on the selected setting, the gesture input system can utilize a corresponding input map for a right or left hand. The gesture input system may further enable a user to select a change in hand-orientation and other mapping preferences.

As another example, even where use of only three fingers is anticipated in performing touch gestures to provide corresponding input commands, the gesture input system may nonetheless determine a hand orientation and calibrate the input zones similar to the example described above in connection with FIG. 6E. For instance, where the touchscreen interface includes enough room for five calibration gestures, a user may place all five fingers (e.g., using a long press) thus enabling the gesture input system to determine an orientation of the hand (e.g., identify a left or right-hand orientation) and define input zones for the three fingers (Rather than for all five fingers). The gesture input system can define the input zones for the three fingers similar to other examples described herein. For example, the gesture input system can identify a centroid and midpoint relative to the points of contact (e.g., three points of contact corresponding to the three fingers) and further determine a calibration origin extending from a middle point of contact (e.g., corresponding to the middle finger) perpendicular to a line extending between the other two points of contact (e.g., corresponding to the index and ring fingers).

Proceeding onto FIGS. 7A-7B, the gesture input system can determine or otherwise define input zones having various shapes and sizes. For instance, where FIGS. 3A-3C above described defining input zones 310a-e having oval shapes and oriented in accordance with a predicted movement of a user's fingers, FIG. 7A illustrates an example in which the gesture input system determines input zones 702a-e defined by larger regions of the touchscreen interface 304. In particular, as shown in FIG. 7A, the gesture input system defines five input zones 702a-e including areas of the touchscreen interface separated by borders. In one or more embodiments, the input zones 702a-e are defined by the borders that pass between respective zones (e.g., as illustrated in FIG. 7A). Alternatively, the input zones 702a-e may be defined by areas determined more generally to correspond any location on a touch-based interface to be the closest to a contained or circumscribed finger or calibration point (e.g., a contact point). Moreover, the gesture input system can define the specific input zones 702a-e in a variety of ways to facilitate convenient and efficient touch-based input within a corresponding input zone.

As further shown, the gesture input system can optionally identify swiping paths 704a-e indicating directions for touch gestures received within the input zones 702a-e. Similar to one or more embodiments described above, the gesture input system can define the swiping paths 704a-e along different directions for the different input zones 702a-e based on a predicted path that fingers will follow on the touchscreen interface 304 when performing swiping gestures. Alternatively, while one or more embodiments described herein describe specific swiping paths, the gesture input system may detect swiping gestures by simply recognizing or otherwise detecting touch gestures within the defined input zones (e.g., rather than specifically detecting swipe gestures along defined swiping paths). For example, the gesture input system may detect a zone-specific swipe gesture based on a displacement of a touch event and/or analysis of a starting and/or end point of a swipe gesture within an input zone (e.g., a starting point for in-swipes and ending point for out swipes).

Similar to one or more embodiments described above, the gesture input system can detect and process touch gestures in accordance with mappings between the input zones 702a-e and input commands. For example, any tap gesture detected within the first input zone 702a may be recognized as an input command corresponding to a tap gesture for the first input zone 702a based on mapping data from an input map. In addition, a directional swipe gesture detected within the first input zone 702a may be recognized as a corresponding input command for the first input zone 702a based on mapping data from the input map.

Similar to one or more embodiments described above, the gesture input system can additionally recalibrate placement of the input zones 702a-e. For example, as shown in FIG. 7B, the gesture input system can detect a shift in a position of the hand relative to a position of the input zones 702a-e. Upon detecting the shift in the position of the hand, the gesture input system can define or otherwise determine updated input zones 706a-e that reflect the new position of the hand on the touchscreen interface 304. As further shown, the gesture input system can optionally define or otherwise determine updated swiping paths 708a-e to reflect the change in position of the hand. Alternatively, as mentioned above, the gesture input system can simply detect swipe gestures with respect to a corresponding input zone.

As shown in FIGS. 7A-7B, the gesture input system can define the input zones 702a-e and updated input zones 706a-e in accordance with a determined hand orientation. In particular, the boundaries between the input zones 702a-e and updated input zones 706a-e may have a shape and orientation based on a determination that calibration gestures have a right-handed orientation. Alternatively, the gesture input system may define input zones having different shapes and boundaries (e.g., mirrored to the input zones for the right-handed orientation) where the calibration gestures are determined to have a left-handed orientation.

Moreover, in accordance with one or more embodiments described above, the gesture input system can define different subzones corresponding to regions within the individual input zones 702a-e. For instance, the gesture input system can define two (or more) subzones for one or more of the input zones 702a-e where an input map includes different mapping data for the respective subzones. Accordingly, the gesture input system can recognize and process different input commands in response to detecting various touch gestures within the respective subzones of the same input zone.

While one or more embodiments described herein include defining input zones in a variety of ways, the gesture input system may nonetheless occasionally detect multiple input events within a single input zone, creating ambiguity in how the input gestures should be interpreted by the gesture input system. For example, in reference to FIG. 7A, the gesture input system may detect simultaneous tap gestures within a second input zone 706b by both the thumb and index finger.

Rather than interpreting both tap gestures as tap gestures for the second input zone (resulting in duplicate input commands rather than two distinct input commands as intended by a user), the gesture input system may instead disambiguate or otherwise resolve ambiguous touch gestures by determining intended zones for the ambiguous touch gestures.

For example, the gesture input system may first determine a discrete location or point of contact of the detected touch gestures. Based on the determined locations of the touch gestures, the gesture input system may determine which of the touch gestures are the least ambiguous. The gesture input system may identify the least ambiguous touch gesture by determining which of the two (or more) touch gestures is closest to a calibration point (e.g., corresponding to a calibration input used in defining the input zone) for the input zone. Excluding the least ambiguous input, the gesture input system may then determine which input zone is closest to the detected touch gesture and extrapolate that the ambiguous touch gesture was intended for the next closest input zone.

Accordingly, in an example where both the thumb and index finger provide tap gestures within the second input zone $702b$, the gesture input system may determine that a first point of contact from the index finger is closer to a calibration point for the second input zone $702b$ than a second point of contact from the thumb. Based on this determination, the gesture input system may identify the first point of contact as less ambiguous than the second point of contact and associate the touch gesture detected at the first point of contact as a touch gesture from the index finger (e.g., intended for the second input zone $702b$). The gesture input system may then identify that the next closest input zone to the second point of contact (e.g., the more ambiguous of the two points of contact) is the first input zone $702a$ and determine that the touch gesture from the thumb was intended for the first input zone $702a$.

As mentioned above, the gesture input system can incorporate various types of input interfaces to accomplish features and functionality described herein. For example, as discussed above, the gesture input system can define input zones on various touch-based interfaces including trackpads, touchscreens, or other devices that include touch-sensitive interfaces. In one or more embodiments, the gesture input system includes input apparatuses including a combination of position-based input as well as touch-based input.

For example, FIG. 8A illustrates an example input interface including a touch-sensitive mouse 804 positioned over a surface (e.g., a desktop, table, or other conductive or non-conductive surface). For example, as shown in FIG. 8A, the touch-sensitive mouse 804 can include a touch-sensitive overlay 806 capable of detecting one or more touch gestures (e.g., tap gestures, swipe gestures), including multi-point touch gestures. As further illustrated, the touch-sensitive mouse 804 can include a motion detection system 808 including mechanical and/or electrical components capable of tracking movement of the touch-sensitive mouse 804 over the surface 802. Accordingly, a user can provide position-based input similar to a conventional mouse by moving the mouse over the surface 802. It will be understood that while FIG. 8A illustrates an example including a touch-sensitive mouse 804, other types of pointing devices (e.g., rolling ball, optical mouse, etc.) capable of detecting movement of the pointing device may be used to provide position-based input commands.

In addition, the gesture input system can detect and process touch gestures detected via the touch-sensitive overlay 806 in accordance with one or more embodiments described herein. For example, the gesture input system can detect calibration gestures at discrete positions (e.g., points of contact) of the touch-sensitive overlay and determine input zones similar to one or more embodiments described above. The input zones can similarly include right-handed or left-handed orientations and may further include subzones. Further, the input zones can be mapped to corresponding input commands to enable a user of the touch-sensitive mouse 804 to type using multiple fingers based on zone-specific mapping to corresponding input commands. In addition, the gesture input system can periodically recalibrate the input zones in accordance with one or more embodiments described above. Accordingly, the gesture input system can facilitate gesture-driven typing similar to other examples described herein.

FIG. 8B illustrates a similar example input interface including a touch-sensitive mouse 810 positioned over the surface 802. As shown in FIG. 8B, the touch-sensitive mouse 810 can include a touch-sensitive overlay 812 similar to the touch-sensitive overlay 806 described above as well as a motion detection system 814 similar to the motion detection system 808 described above. In addition, the touch-sensitive mouse 810 can include a palm rest 816 or other support that serves as an anchor for the hand in providing touch-based inputs and moving the touch-sensitive mouse 810 about the surface 802.

Similar to the touch-sensitive mouse 804 of FIG. 8A, the gesture input system can similarly detect calibration gestures detected on the touch-sensitive overlay 812 of the touch-sensitive mouse 810, determine input zones (e.g., including subzones and swiping paths), recalibrate the zones, and perform other features and functions described in other example embodiments herein. In addition, in one or more embodiments, the palm rest 816 may provide an additional input mechanism, for example, where the palm rest 816 includes a roller ball or clicking mechanism for providing additional input commands.

FIG. 8C illustrates another example input interface including a trackpad 820 positioned on the surface 802. As shown in FIG. 8C, the trackpad 820 includes a touch-sensitive surface 822 capable of detecting multi-point touch inputs. Similar to one or more embodiments described above, the gesture input system can detect calibration gestures, determine input zones, process input commands based on zone-specific mapping data, and recalibrate the input zones similar to examples described above. In addition, in one or more embodiments, the trackpad 820 can detect position-based input based on movement of a point of contact on the touch-sensitive surface 822.

In one or more embodiments, the gesture input system may switch between position-based input and touch-based input to avoid conflicting types of input detected by the trackpad 820. For example, in response to a predefined gesture or series of gestures (e.g., a four-finger swipe, a long swipe, triple tap, etc.), the gesture input system may switch between a position-based input mode in which moving a finger (or other input object) over the touch-sensitive surface 822 is interpreted as positioned-based input similar to moving a mouse over the surface 802, to a gesture-based input mode in which touch gestures detected within corresponding input zones are mapped to corresponding input commands. In this way, the gesture input system can facilitate convenient transition between gesture-based typing (or other gesture-based input) and moving a cursor on a graphical user interface.

FIG. 9 illustrates another example input interface in accordance with one or more embodiments described herein.

In particular, FIG. 9 illustrates an example input interface including a touchscreen 902 (or other touch-based interface capable of detecting multi-point touch inputs) and a position-based input device 904 configured to provide position-based input by moving (e.g., horizontal movement, vertical movement, rotational movement) over a surface of the touchscreen 902. As further shown, the gesture input system can detect and recognize touch input within a gesture detection area 906 that surrounds a current position of the position-based input device 904. In particular, as shown in FIG. 9, a user can place their hand over the position-based input device 904 such that their fingers can interact with the touchscreen 902 within the gesture detection area 906.

Similar to one or more embodiments described herein, the gesture input system can detect calibration gestures, determine input zones within the gesture detection area 906, execute input commands in accordance with zone-specific mapping data, and periodically recalibrate the input zones. In one or more embodiments, the gesture input system recalibrates the input zones upon detecting a shift of the position-based input device 904 and/or the gesture detection area 906. For example, where a user moves the position-based input device 904, the gesture input system may recalibrate the input zones once the position-based input device 904 has stopped moving. Accordingly, the gesture input system can recalibrate the input zones each time a user provides a position-based input (e.g., moves or rotates the position-based input device 904).

In addition, while FIG. 9 illustrates an example including a position-based input device 904 that moves across a surface of a touchscreen 902, the gesture input system may similarly detect and process finger-specific touch gestures using a position-based input device 904 on a different surface (Or on a similar type of surface, but in a different way). For example, in one or more embodiments, the position-based input device 904 includes a number of sensors (e.g., optical sensors, ultrasonic sensors) that can detect a presence or position of one or more fingers around the position-based input device 904. While not detecting a point of contact similar to a touchscreen interface, these sensors may nonetheless detect contact of a finger with the surface as well as the finger's radial position and distance relative to the position-based input device 904.

Thus, the gesture input system can determine input zones that extend radially outward from the position-based input device 904 where the surface over which the position-based input device 904 is either a conductive surface (e.g., similar to the touchscreen interface 902 of FIG. 9) or a non-conductive surface. Indeed, using a position-based input device 904 in this example, the gesture input system can detect finger-specific taps and swipes similar to other embodiments described herein, and may do so using a smaller footprint than many of the other examples described herein.

Figure 10:
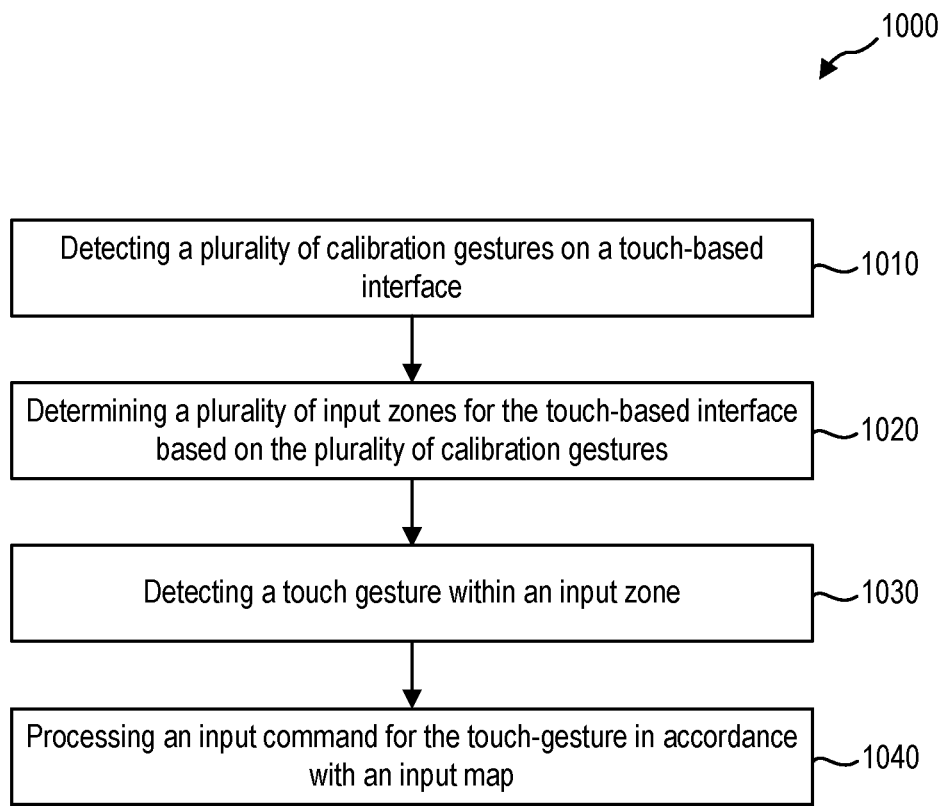
FIG. 10 illustrates a flowchart of a series of acts for implementing a self-calibrating, gesture-driven input system in accordance with one or more embodiments.
Figure 11:
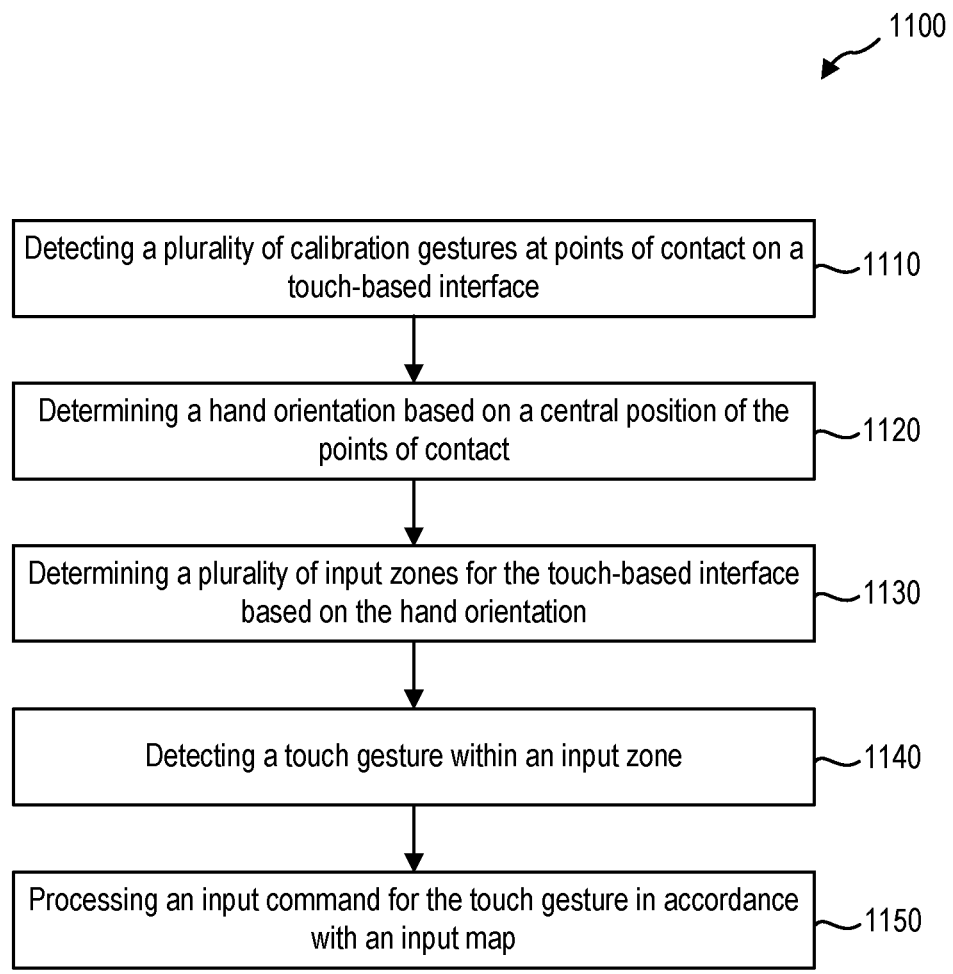
FIG. 11 illustrates another flowchart of a series of acts for implementing a self-calibrating gesture-driven input system in accordance with one or more embodiments.

Turning now to FIGS. 10-11, these figures illustrate flowcharts including example series of acts for implementing a self-calibrating gesture-driven input system. While FIGS. 10-11 illustrate acts according to one or more embodiments, alternative embodiments may omit, add to, reorder, and/or modify any of the acts shown in FIGS. 10-11. The acts of FIGS. 10-11 can be performed as part of a method. Alternatively, a non-transitory computer readable storage medium can include instructions that, when executed by one or more processors, cause a computing device to perform the acts of FIGS. 10-11. In still further embodiments, a system can perform the acts of FIGS. 10-11.

For example, as illustrated in FIG. 10, the series of acts 1000 includes an act 1010 of detecting a plurality of calibration gestures on a touch-based interface. For example, in one or more embodiments, the act 1010 includes detecting, via a touchscreen interface of a client device, a plurality of calibration gestures at points of contact on the touchscreen interface.

As further shown in FIG. 10, the series of acts 1000 includes an act 1020 of determining a plurality of input zones for the touch-based interface based on the plurality of calibration gestures. For example, in one or more embodiments, the act 1020 includes determining, based on the detected plurality of calibration gestures, a plurality of input zones for the touchscreen interface, the plurality of input zones corresponding to regions of the touchscreen interface. In one or more embodiments, determining the plurality of input zones includes defining discrete regions of the touchscreen interface for detecting zone-specific touch gestures mapped to corresponding input commands from the input map.

As further shown in FIG. 10, the series of acts 1000 includes an act 1030 of detecting a touch gesture within an input zone. For example, in one or more embodiments, the act 1030 includes detecting a touch gesture within an input zone of the plurality of input zones.

As further shown, the series of acts 1000 includes an act 1040 of processing an input command for the touch-gesture in accordance with an input map. For example, in one or more embodiments, the act 1040 includes in response to detecting the touch gesture within the input zone, processing an input command for the touch gesture in accordance with an input map where the input map includes a mapping between the input zone and the input command. In one or more embodiments, the input map includes a mapping between touch gestures for the plurality of input zones and input commands including numbers, letters, and one or more additional keyboard commands from a digital keyboard application.

In one or more embodiments, the series of acts 1000 recalibrating the input zones. For example, the series of acts 1000 can include detecting a shift in position of one or more touch gestures on the touchscreen interface corresponding to one or more input zones of the plurality of input zones. Detecting the shift in position may include identifying a recalibration input where the recalibration input includes a touch gesture mapped to a corresponding input command from the input map and detecting a shift in position between two or more subsequent instances of the recalibration input. In addition, the series of acts 1000 can include modifying the plurality of input zones by updating positions of the plurality of input zones to different locations on the touchscreen interface based on the detected shift in position of the one or more touch gestures corresponding to the one or more input zones.

In one or more embodiments, the plurality of input zones include an anchor zone associated with a long-press touch gesture on the touchscreen interface. Further, detecting the shift in position of one or more touch gestures may include detecting a shift in position of the one or more touch gestures on the touchscreen interface relative to a position of the anchor zone.

In one or more embodiments, the input zones include one or more subzones. For example, a first input zone from the plurality of input zones may include a plurality of subzones corresponding to different portions of the first input zone.

Further, the input map may include different input commands mapped to the plurality of subzones of the first input zone.

As indicated above, FIG. 11 illustrates another series of acts for implementing a self-calibrating gesture-driven input system. For example, the series of acts 1100 includes an act 1110 of detecting a plurality of calibration gestures at points of contact on a touch-based interface. For example, in one or more embodiments, the act 1110 can include detecting, via a touchscreen interface of a client device, three or more calibration gestures at points of contact of the touchscreen interface. In one or more embodiments, detecting the three or more calibration gestures includes detecting a five-finger touch gesture where the five-finger touch gesture includes five touch gestures detected at five discrete locations on the touchscreen interface.

As further shown in FIG. 11, the series of acts 1100 includes an act 1120 of determining a hand orientation based on a central position of the points of contact. For example, in one or more embodiments, the act 1120 can include determining a hand orientation based on a central position on the touchscreen interface relative to positions of the points of contact of the three or more calibration gestures. In one or more embodiments, determining the hand orientation includes identifying a left-hand orientation based on an orientation of the points of contact corresponding to the three or more calibration gestures or, alternatively, identifying a right-hand orientation based on the orientation of the points of contact corresponding to the three or more calibration gestures. In one or more embodiments, the series of acts 1100 includes recognizing two distinct hand orientations between the plurality of points of contact.

As further shown, the series of acts 1100 includes an act 1130 of determining a plurality of input zones for the touch-based interface based on the hand orientation. For example, in one or more embodiments, the act 1130 can include based on the determined hand orientation, determining a plurality of input zones for the touchscreen interface corresponding to regions of the touchscreen interface.

In addition, the series of acts 1100 can include an act 1140 of detecting a touch gesture within an input zone. For example, in one or more embodiments, the act 1140 includes detecting a touch gesture within an input zone of the plurality of input zones. Upon detecting the touch gesture, the series of acts 1100 can include an act 1150 of processing an input command for the touch gesture in accordance with an input map. For example, in one or more embodiments, the act 1150 includes in response to detecting the touch gesture within the input zone, processing an input command for the touch gesture in accordance with an input map, the input map comprising a mapping between the input zone and the input command.

In one or more embodiments, the series of acts 1100 includes detecting an additional three or more calibration gestures at different positions of the touchscreen interface than the points of contact of the three or more calibration gestures. In addition, the series of acts 1100 includes determining an additional hand orientation based on an additional central position on the touchscreen interface relative to the different positions of the additional three or more calibration gestures. The series of acts 1100 can further include based on the determined additional hand orientation, determining an additional plurality of input zones for the touchscreen interface corresponding to additional regions of the touchscreen interface.

In one or more embodiments, the series of acts 1100 further includes determining a first mapping between the plurality of input zones and corresponding input commands where the first mapping comprises a first plurality of input commands corresponding to touch gestures for the plurality of input zones. In addition, the series of acts 1100 can further include determining a second mapping between the additional plurality of input zones and corresponding input commands where the second mapping comprises a second plurality of input commands corresponding to touch gestures for the additional plurality of input zones. In one or more embodiments, one or more of the plurality of input zones includes a plurality of subzones corresponding to different portions of the respective input zones(s) where the input map includes different input commands mapped to the plurality of subzones within the first input zone One or both of the series of acts 1000, 1100 may be implemented by a system including an input apparatus comprising a touch-based input device including a touch-based interface and a position-based input device comprising a non-touch-based interface. For example, a series of acts may include detecting a plurality of calibration gestures detected at points of contact on the touch-based interface using a touch-based interface of the touch-based input device. Moreover, the system can recalibrate one or more of the input zones based on input detected by the position-based input device. In one or more embodiments, the position-based input device includes one or more of a three-dimensional mouse, a trackball, or a trackpad.

For example, in one or more embodiments, an input apparatus includes a pointing apparatus where the touch-based interface includes a touch-sensitive overlay configured to detect touch gestures. In addition, the non-touch-based interface may include a motion-detection system (e.g., an optical motion sensor) on the pointing apparatus configured to detect movement of the pointing apparatus relative to a surface. In one or more embodiments, the input apparatus includes a pointing apparatus configured to move relative to a touch-sensitive interface configured to detect touch gestures where the non-based interface includes the pointing apparatus configured to detect movement of the pointing apparatus relative to the touch-sensitive surface.

Moreover, in one or more embodiments, one or more of the series of acts may include detecting movement of the pointing apparatus where detecting movement of the pointing apparatus includes one or more of detecting a horizontal or vertical movement of the pointing apparatus along the touch-sensitive surface or detecting a rotational movement of the pointing apparatus around an axis orthogonal to the touch-sensitive surface. The series of acts can further include modifying the plurality of input zones based on the detected movement of the pointing apparatus.

In one or more embodiments, one or more of the series of acts may include detecting a position-based input via the position-based input device. In addition, the series of acts may include in response to detecting the position-based input, recalibrating the plurality of input zones by modifying a position of one or more of the plurality of input zones.

As another example, in one or more embodiments, a series of acts may include detecting a predefined transition input (e.g., a triple click, four-finger long-press). The series of acts may further include, in response to detecting the predefined transition input, transition from a touch-based input mode in which a directional touch gesture detected within a first input zone of the plurality of input zones corresponds to an input command in accordance with the input map to a position-based input mode in which the directional touch gesture corresponds to a position-based input different from the input command. This may be particularly useful when using a trackpad or other input device capable of recognizing both touch-gesture inputs as well as position-based input.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable storage medium and executable by one or more computing devices (e.g., any of the media content access devices described herein). In general, a processor (e.g., a microprocessor) receives instructions, from a non-transitory computer-readable storage medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
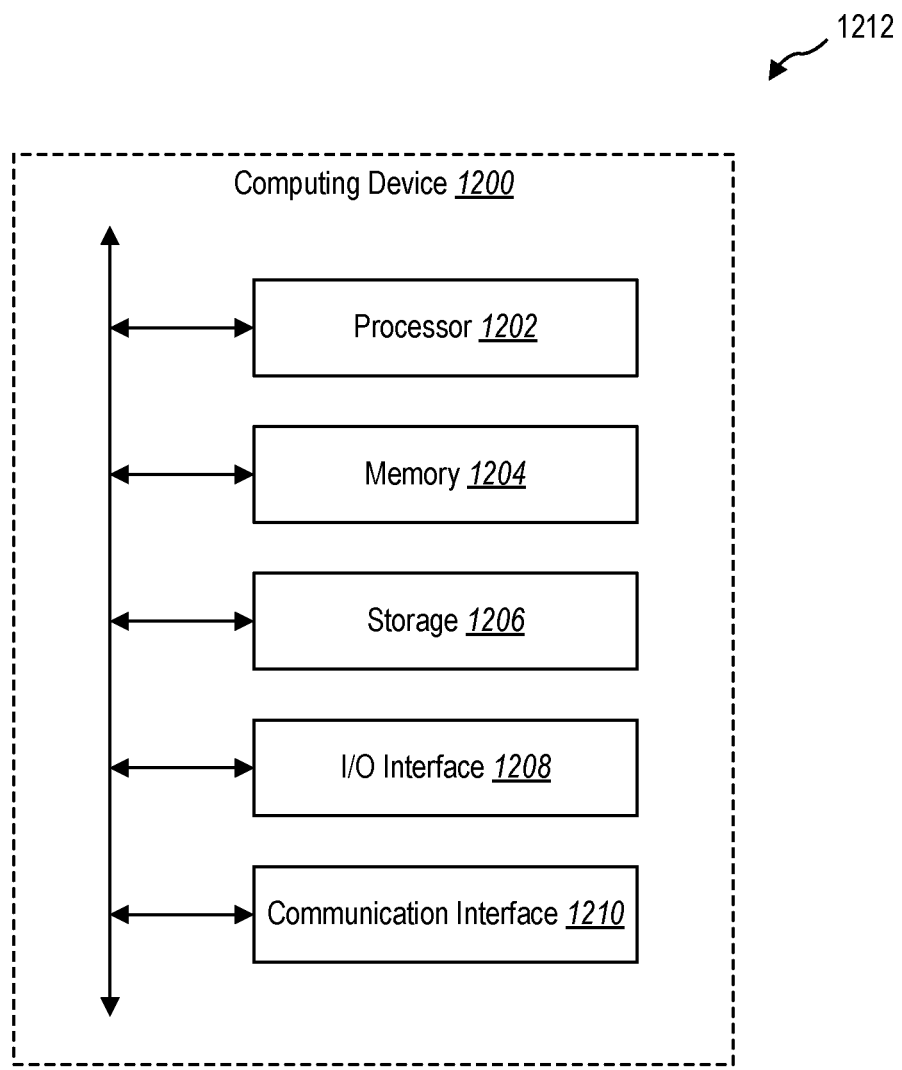
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above in connection with one or more embodiments (e.g., client device 102, mobile device 202, client device 302). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touchscreen, camera, optical scanner, network interface, modem, other known I/O devices or a combination of such I/O interfaces 1208. The touchscreen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions thereon that, when executed by at least one processor, causes a client device to:
   detect, via a touchscreen interface of the client device, a plurality of calibration gestures at points of contact on the touchscreen interface;
   determine, based on the detected plurality of calibration gestures, a plurality of input zones for the touchscreen interface, the plurality of input zones corresponding to regions of the touchscreen interface;
   identify an input map comprising mappings between the plurality of input zones and a plurality of input commands, and wherein at least one input command from the plurality of input commands is associated with a recalibration input;
   detect a touch gesture within an input zone of the plurality of input zones, wherein the touch gesture within the input zone is indicated as a recalibration input within the input map;
   process an input command for the touch gesture based on a mapping between the input zone and the input command within the input map; and
   based on the touch gesture being indicated as the recalibration input, determine an updated plurality of input zones corresponding to updated regions of the touchscreen interface.

2. The non-transitory computer-readable medium of claim 1, wherein the input map comprises a mapping between touch gestures for the plurality of input zones and input commands including numbers, letters, and one or more additional keyboard commands from a digital keyboard application.

3. The non-transitory computer-readable medium of claim 1, wherein determining the plurality of input zones comprises defining discrete regions of the touchscreen interface for detecting zone-specific touch gestures mapped to corresponding input commands from the input map.

4. The non-transitory computer-readable medium of claim 1, wherein determining the updated plurality of input zones comprises:
  detecting a shift in position between two or more subsequent instances of the recalibration input; and
  modifying the plurality of input zones based on the detected shift in position between the two or more subsequent instances of the recalibration input.

5. The non-transitory computer-readable medium of claim 1, wherein the recalibration input refers to a frequently used symbol or action within the input mapping.

6. The non-transitory computer-readable medium of claim 4, wherein the recalibration input is associated with a long-press touch gesture on the touchscreen interface, and wherein determining the updated plurality of input zones comprises detecting a shift in position of one or more of the plurality of input zones in response to detecting the long-press touch gesture.

7. The non-transitory computer-readable medium of claim 1, wherein a first input zone from the plurality of input zones comprises a plurality of subzones corresponding to different portions of the first input zone, and wherein the input map comprises different input commands mapped to the plurality of subzones of the first input zone.

8. A computer-implemented method comprising:
  detecting, via a touchscreen interface of a client device, one or more calibration gestures at three or more points of contact on a surface of the touchscreen interface;
  determining a hand orientation for the one or more calibration gestures based on a central position on the touchscreen interface relative to the three or more positions of the points of contact of the one or more calibration gestures;
  based on the determined hand orientation, determining a plurality of input zones for the touchscreen interface corresponding to regions of the touchscreen interface;
  detecting a touch gesture within an input zone of the plurality of input zones; and
  in response to detecting the touch gesture within the input zone, processing an input command for the touch gesture in accordance with an input map, the input map comprising a mapping between the input zone and the input command.

9. The computer-implemented method of claim 8, wherein detecting the one or more calibration gestures comprises detecting a five-finger touch gesture, the five-finger touch gesture comprising five touch gestures detected at five discrete locations on the touchscreen interface.

10. The computer-implemented method of claim 8, further comprising determining the hand orientation by:
  identifying a left-hand orientation based on an orientation of the points of contact corresponding to the one or more calibration gestures; or
  identifying a right-hand orientation based on the orientation of the points of contact corresponding to the one or more calibration gestures.

11. The computer-implemented method of claim 8, further comprising:
  detecting an additional one or more calibration gestures at different positions of the touchscreen interface than the points of contact of the one or more calibration gestures;
  determining an additional hand orientation based on an additional central position on the touchscreen interface relative to the different positions of the additional one or more calibration gestures; and
  based on the determined additional hand orientation, determining an additional plurality of input zones for the touchscreen interface corresponding to additional regions of the touchscreen interface.

12. The computer-implemented method of claim 11, further comprising:
  determining a first mapping between the plurality of input zones and corresponding input commands, wherein the first mapping comprises a first plurality of input commands corresponding to touch gestures for the plurality of input zones; and
  determining a second mapping between the additional plurality of input zones and corresponding input commands, wherein the second mapping comprises a second plurality of input commands corresponding to touch gestures for the additional plurality of input zones.

13. The computer-implemented method of claim 8, wherein determining the hand orientation comprises:
  determining the central position relative to locations of the three or more points of contact on the surface of the touchscreen interface;
  determining a plurality of angles between the three or more points of contact relative to the central position; and
  determining a right-hand orientation or a left-hand orientation for the one or more calibration gestures based on the plurality of angles between the three or more points of contact relative to the central position.

14. A system comprising:
  an input apparatus comprising:
    a touch-based input device including a touch-based interface configured to detect one or more touch-based gestures; and
    a position-based input device comprising a non-touch-based interface configured to detect movement of the input apparatus relative to a surface;
  at least one processor; and
  at least one non-transitory computer-readable storage medium storing instructions that, when executed by the at least one processor, cause the system to:
    detect, via the touch-based interface of the touch-based input device, a plurality of calibration gestures detected at points of contact on the touch-based interface;
    determine, based on the detected plurality of calibration gestures, a plurality of input zones corresponding to regions of the touch-based interface;
    detect a touch gesture within an input zone of the plurality of input zones; and
    in response to detecting the touch gesture within the input zone, process an input command for the touch gesture in accordance with an input map, the input map comprising a mapping between the input zone and the input command.

15. The system of claim 14, wherein the input apparatus comprises a pointing apparatus, wherein the touch-based interface comprises a touch-sensitive overlay configured to detect touch gestures, and wherein the non-touch-based interface comprises a motion-detection system on the pointing apparatus configured to detect movement of the pointing apparatus relative to the surface.

16. The system of claim 14, wherein the plurality of input zones include a plurality of radially extending zones from the input apparatus, wherein the touch-based interface comprises one or more sensors configured to detect interactions of fingers with the surface, and wherein the non-touch-based interface comprises a motion-detection system configured to detect movement of the input apparatus surface.

17. The system of claim 15, further comprising instructions that, when executed by the at least one processor, cause the system to:
  detect movement of the pointing apparatus, wherein detecting movement of the pointing apparatus comprises one or more of:
    detecting a horizontal or vertical movement of the pointing apparatus along the touch-sensitive surface; or
    detecting a rotational movement of the pointing apparatus around an axis orthogonal to the touch-sensitive surface; and
    modifying the plurality of input zones based on the detected movement of the pointing apparatus.

18. The system of claim 14, wherein the position-based input device comprises one or more of a three-dimensional mouse, a trackball, or a trackpad.

19. The system of claim 14, further comprising instructions that, when executed by the at least one processor, cause the system to:
  detect a position-based input via the position-based input device; and
  in response to detecting the position-based input, recalibrate the plurality of input zones by modifying a position of one or more of the plurality of input zones.

20. The system of claim 14, further comprising instructions that, when executed by the at least one processor, cause the system to:
  detect a predefined transition input; and
  in response to detecting the predefined transition input, transition from a touch-based input mode in which a directional touch gesture detected within a first input zone of the plurality of input zones corresponds to a first input command in accordance with the input map to a position-based input mode in which the directional touch gesture corresponds to a position-based input different from the first input command.

* * * * *